(12) United States Patent
Coughlin et al.

(10) Patent No.: US 7,097,253 B2
(45) Date of Patent: Aug. 29, 2006

(54) ROUND RECLINER ASSEMBLY WITH REAR FOLDING LATCH

(75) Inventors: Craig J Coughlin, Shelby, MI (US); Jeffery T Bonk, Clinton Township, MI (US); Scott Fast, Macomb Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/910,794

(22) Filed: Aug. 3, 2004

(65) Prior Publication Data

US 2005/0212341 A1    Sep. 29, 2005

Related U.S. Application Data

(63) Continuation-in-part of application No. 10/798,930, filed on Mar. 11, 2004.

(51) Int. Cl.
*B60N 2/00* (2006.01)

(52) U.S. Cl. .................... 297/378.12; 297/367

(58) Field of Classification Search ........... 297/378.12, 297/378.14, 367
See application file for complete search history.

(56) References Cited

U.S. PATENT DOCUMENTS

| | | |
|---|---|---|
| 775 A | 6/1838 | Carver |
| 289,653 A | 12/1883 | Haynes |
| 2,507,997 A | 5/1950 | Roedding et al. |
| 2,941,583 A | 6/1960 | Tischler et al. |
| 3,459,065 A | 8/1969 | Fender |
| 3,641,838 A | 2/1972 | Turner |
| 3,663,056 A | 5/1972 | Turner |
| 3,737,946 A | 6/1973 | Guiliani |
| 3,879,802 A | 4/1975 | Werner |
| 3,901,100 A | 8/1975 | Iida et al. |
| 4,076,309 A | 2/1978 | Chekirda et al. |
| 4,082,352 A | 4/1978 | Bales et al. |
| 4,085,969 A | 4/1978 | Nakane et al. |
| 4,087,885 A | 5/1978 | Gillentine |
| 4,103,970 A | 8/1978 | Homier |
| 4,133,578 A | 1/1979 | Fancy |
| 4,143,905 A | 3/1979 | Hensel et al. |
| 4,159,815 A | 7/1979 | Strowik et al. |
| 4,348,050 A | 9/1982 | Letournoux et al. |
| 4,591,207 A | 5/1986 | Nithammer et al. |
| 4,709,965 A | 12/1987 | Kazaoka et al. |
| 4,765,680 A | 8/1988 | Kawashima |
| 4,767,158 A | 8/1988 | Satoh |
| 4,770,464 A | 9/1988 | Pipon et al. |
| 4,875,735 A | 10/1989 | Moyer et al. |

(Continued)

FOREIGN PATENT DOCUMENTS

FR    2 578 602    9/1986

*Primary Examiner*—Peter M. Cuomo
*Assistant Examiner*—Sarah B. McPartlin
(74) *Attorney, Agent, or Firm*—Harness, Dickey & Pierce, P.L.C.

(57) ABSTRACT

A vehicle seat recliner and folding latch assembly is provided. The assembly generally includes a lower quadrant disk, a slide pin sub-assembly and a recliner disk. The slide pin sub-assembly is supported on the lower quadrant disk for pivotal displacement between a first position and a second position. The recliner disk is supported for pivotal displacement on the slide-pin sub-assembly. The recliner disk includes an engagement edge engaging the slide pin sub-assembly. The engagement edge is adapted to lock the slide pin sub-assembly in the first and second positions.

22 Claims, 19 Drawing Sheets

U.S. PATENT DOCUMENTS

| | | |
|---|---|---|
| 4,884,845 A | 12/1989 | Schmale et al. |
| 4,946,223 A | 8/1990 | Croft et al. |
| 4,995,669 A | 2/1991 | Croft |
| 4,997,223 A | 3/1991 | Croft |
| 5,150,632 A | 9/1992 | Hein |
| 5,161,856 A | 11/1992 | Nishino |
| 5,301,569 A | 4/1994 | Droulon |
| 5,507,553 A | 4/1996 | Nishizawa et al. |
| 5,558,402 A | 9/1996 | Yamada |
| 5,590,931 A | 1/1997 | Fourrey et al. |
| 5,611,599 A | 3/1997 | Baloche et al. |
| 5,622,407 A | 4/1997 | Yamada et al. |
| 5,632,525 A | 5/1997 | Uramichi |
| 5,664,836 A | 9/1997 | Takagi |
| 5,664,837 A | 9/1997 | Takagi |
| 5,664,838 A | 9/1997 | Baloche |
| 5,678,895 A | 10/1997 | Matsuura et al. |
| 5,681,086 A | 10/1997 | Baloche |
| 5,692,589 A | 12/1997 | Beguin |
| 5,702,156 A | 12/1997 | Takagi |
| 5,709,133 A | 1/1998 | Coggon et al. |
| 5,718,483 A | 2/1998 | Yamaguchi et al. |
| 5,725,452 A | 3/1998 | Droulon et al. |
| 5,749,624 A | 5/1998 | Yoshida |
| 5,749,625 A | 5/1998 | Robinson |
| 5,755,491 A | 5/1998 | Baloche et al. |
| 5,762,400 A | 6/1998 | Okazaki et al. |
| 5,769,494 A | 6/1998 | Barrere et al. |
| 5,779,313 A | 7/1998 | Rohee |
| 5,785,386 A | 7/1998 | Yoshida |
| 5,788,325 A | 8/1998 | Ganot |
| 5,813,724 A | 9/1998 | Matsuura et al. |
| 5,816,656 A | 10/1998 | Hoshihara et al. |
| 5,820,218 A | 10/1998 | Baloche et al. |
| 5,820,219 A | 10/1998 | Rohee |
| 5,857,746 A | 1/1999 | Barrere et al. |
| 5,871,414 A | 2/1999 | Voss et al. |
| 5,873,630 A | 2/1999 | Yoshida et al. |
| 5,881,854 A | 3/1999 | Rougnon-Glasson |
| 5,884,972 A | 3/1999 | Deptolla |
| 5,934,753 A | 8/1999 | Lange |
| 5,984,413 A | 11/1999 | Baloche et al. |
| 5,997,090 A | 12/1999 | Baloche et al. |
| 6,003,945 A | 12/1999 | Kojima |
| 6,007,152 A | 12/1999 | Kojima et al. |
| 6,007,153 A | 12/1999 | Benoit et al. |
| 6,019,430 A | 2/2000 | Magyar et al. |
| 6,023,994 A | 2/2000 | Yoshida |
| 6,039,400 A | 3/2000 | Yoshida et al. |
| 6,082,821 A | 7/2000 | Baloche et al. |
| 6,085,386 A | 7/2000 | Blanchard et al. |
| 6,092,874 A | 7/2000 | Kojima et al. |
| 6,095,608 A | 8/2000 | Ganot et al. |
| 6,102,480 A | 8/2000 | Asano |
| 6,112,370 A | 9/2000 | Blanchard et al. |
| 6,120,098 A | 9/2000 | Magyar et al. |
| 6,139,104 A * | 10/2000 | Brewer ........................ 297/353 |
| 6,142,569 A | 11/2000 | Kidokoro et al. |
| 6,149,235 A | 11/2000 | Fahim |
| 6,161,899 A * | 12/2000 | Yu ......................... 297/378.12 |
| 6,164,723 A | 12/2000 | Ganot |
| 6,178,596 B1 | 1/2001 | Choi |
| 6,220,666 B1 | 4/2001 | Ohya |
| 6,224,157 B1 | 5/2001 | Di Luccio |
| 6,253,894 B1 | 7/2001 | Schumann et al. |
| 6,283,886 B1 | 9/2001 | Schumann |
| 6,312,053 B1 | 11/2001 | Magyar |
| 6,318,805 B1 | 11/2001 | Asano |
| 6,325,458 B1 | 12/2001 | Rohee et al. |
| 6,328,382 B1 | 12/2001 | Yamashita |
| 6,328,383 B1 | 12/2001 | Rohee et al. |
| 6,332,647 B1 | 12/2001 | Yoshida et al. |
| 6,332,649 B1 | 12/2001 | Vossmann |
| 6,338,532 B1 | 1/2002 | Sugimoto |
| 6,364,413 B1 | 4/2002 | Rohee et al. |
| 6,390,557 B1 | 5/2002 | Asano |
| 6,402,249 B1 | 6/2002 | Rohee et al. |
| 6,439,663 B1 | 8/2002 | Ikegaya |
| 6,447,066 B1 * | 9/2002 | Chabanne et al. .......... 297/367 |
| 6,454,354 B1 | 9/2002 | Vossmann et al. |
| 6,464,298 B1 | 10/2002 | Hansel et al. |
| 6,474,740 B1 | 11/2002 | Kondo et al. |
| 6,488,338 B1 | 12/2002 | Hoshihara |
| 6,511,129 B1 * | 1/2003 | Minor et al. ................ 297/367 |
| 6,513,875 B1 * | 2/2003 | Gray et al. ............ 297/378.12 |
| 6,520,583 B1 | 2/2003 | Bonk |
| 6,550,864 B1 * | 4/2003 | Zarna et al. ........... 297/378.12 |
| 6,554,362 B1 * | 4/2003 | Pospeshil ............... 297/378.14 |
| 6,568,756 B1 * | 5/2003 | Sugimoto et al. .......... 297/335 |
| 6,601,921 B1 * | 8/2003 | Collins .................. 297/378.12 |
| 6,634,714 B1 * | 10/2003 | Pejathaya .............. 297/378.12 |
| 6,669,299 B1 * | 12/2003 | Carlson et al. ......... 297/378.14 |
| 6,739,668 B1 * | 5/2004 | Coman et al. .......... 297/378.12 |
| 6,880,888 B1 * | 4/2005 | Rabbach et al. ........ 297/378.12 |
| 2001/0001220 A1 | 5/2001 | Rohee et al. |
| 2002/0000746 A1 | 1/2002 | Matsuura et al. |
| 2002/0017811 A1 | 2/2002 | Cilliere et al. |
| 2002/0024246 A1 | 2/2002 | Yamada et al. |
| 2002/0033627 A1 | 3/2002 | Hoshihara et al. |
| 2002/0041119 A1 | 4/2002 | Kojima et al. |
| 2002/0043852 A1 | 4/2002 | Uramichi |
| 2002/0043855 A1 | 4/2002 | Lange |
| 2002/0043856 A1 | 4/2002 | Ikegaya |
| 2002/0050732 A1 | 5/2002 | Koga et al. |
| 2002/0053825 A1 | 5/2002 | Reubeuze et al. |
| 2002/0070596 A1 | 6/2002 | Nonomiya et al. |
| 2002/0096922 A1 | 7/2002 | Villaroel et al. |
| 2002/0096923 A1 | 7/2002 | Uramichi |
| 2002/0096924 A1 | 7/2002 | Reubeuze |
| 2002/0096925 A1 | 7/2002 | Uramichi |

\* cited by examiner

ROUND RECLINER ASSEMBLY WITH REAR FOLDING LATCH

CROSS-REFERENCE TO RELATED APPLICATIONS

This application is a continuation-in-part of U.S. patent application Ser. No. 10/798,930, filed on Mar. 11, 2004. The disclosure of the above application is incorporated herein by reference.

FIELD OF THE INVENTION

The present invention relates to a vehicle seat latch assembly and, more particularly, to a combination vehicle seat recliner and folding latch assembly.

BACKGROUND OF THE INVENTION

Vehicle markets are extremely competitive, particularly the minivan and sport utility markets. A growing focus of the competition is the overall utility and comfort of these vehicles. One important utility feature that is gaining much attention includes flexible vehicle interiors, and more particularly, flexible front and second row seating assemblies. Flexibility in this sense refers to the ability to modify the configuration of a particular seating assembly. For example, a passenger might desire to fold down a front or second row seat to provide a work space during travel. As such, a passenger could use the rear of the folded down seat as a desk. Additionally, a passenger might desire to configure the seat in a manner providing for an open area in the cargo compartment of the vehicle. As such, a customer could use the cargo compartment to load large items on top of a load floor.

SUMMARY OF THE INVENTION

A vehicle seat recliner and folding latch assembly is provided. The assembly generally includes a lower quadrant disk, a slide pin sub-assembly and a recliner disk. The slide pin sub-assembly is supported on the lower quadrant disk for pivotal displacement between a first position and a second position. The recliner disk is supported for pivotal displacement on the slide-pin subassembly. The recliner disk includes an engagement edge engaging the slide pin sub-assembly. The engagement edge is adapted to lock the slide pin sub-assembly in the first and second positions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
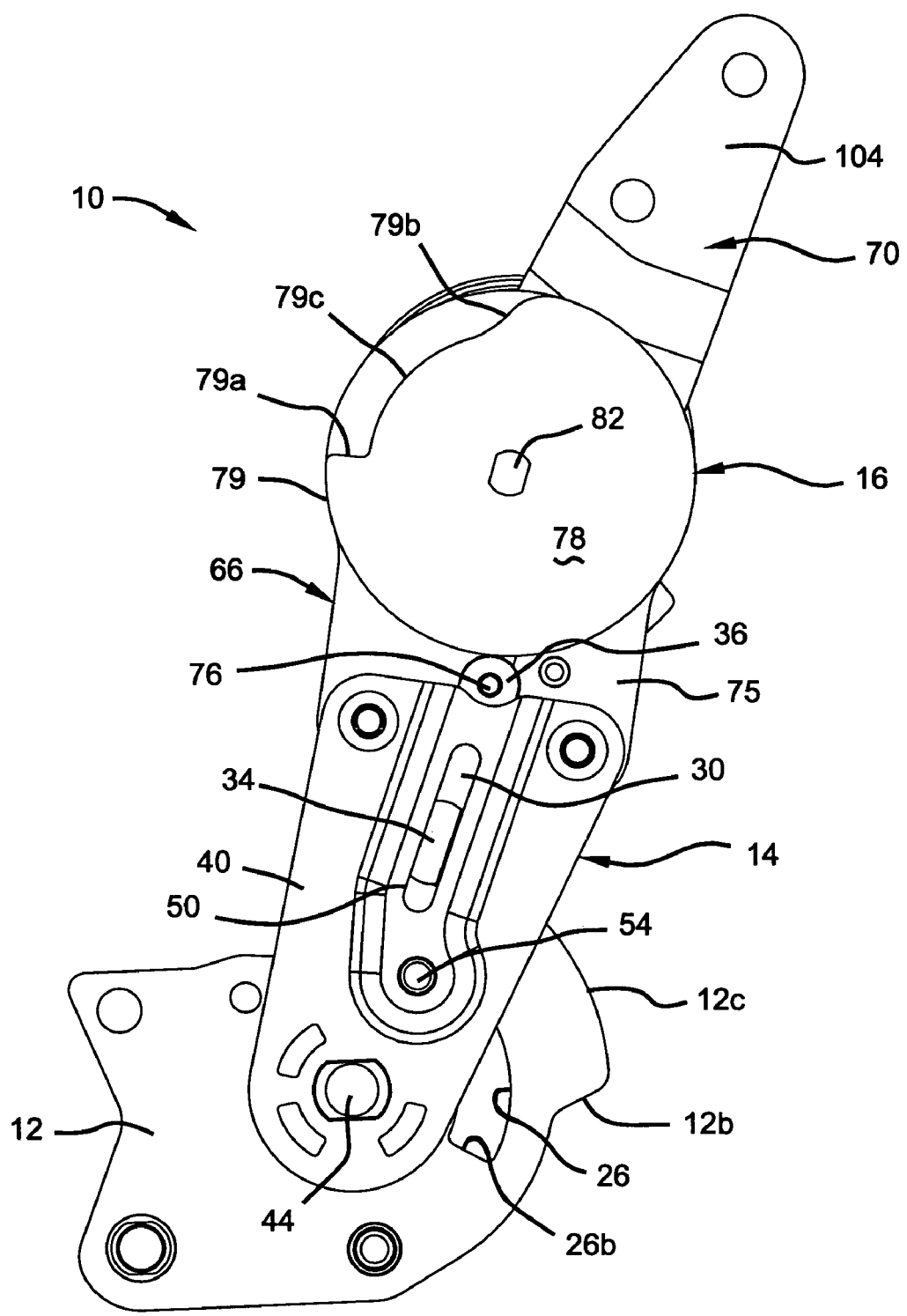
FIG. 1 is a side view of an exemplary vehicle seat recliner and folding latch assembly in accordance with the present invention.

The following description of the preferred embodiments is merely exemplary in nature and is in no way intended to limit the scope of the invention, its application, or its uses.

With reference to FIGS. 1–4, a vehicle seat recliner and folding latch assembly 10 in accordance with the present invention is described. The assembly 10 generally includes a lower quadrant disk 12, a slide pin sub-assembly 14 and a recliner mechanism 16. The slide pin sub-assembly 14 is supported on the lower quadrant disk 12 for pivotal displacement between a first position (shown in FIG. 5A) and a second position (shown in FIG. 5E). The recliner mechanism 16 is supported for rotational displacement on and relative to the slide pin sub-assembly 14 and is adapted to lock the slide-pin subassembly 14 in the first and second positions. The lower quadrant disk 12 includes a first thrust shoulder 12a, a second thrust shoulder 12b and a cammed surface 12c. The lower quadrant disk 12 further includes a pivot aperture 24 and an arcuate slot 26.

Figure 2:
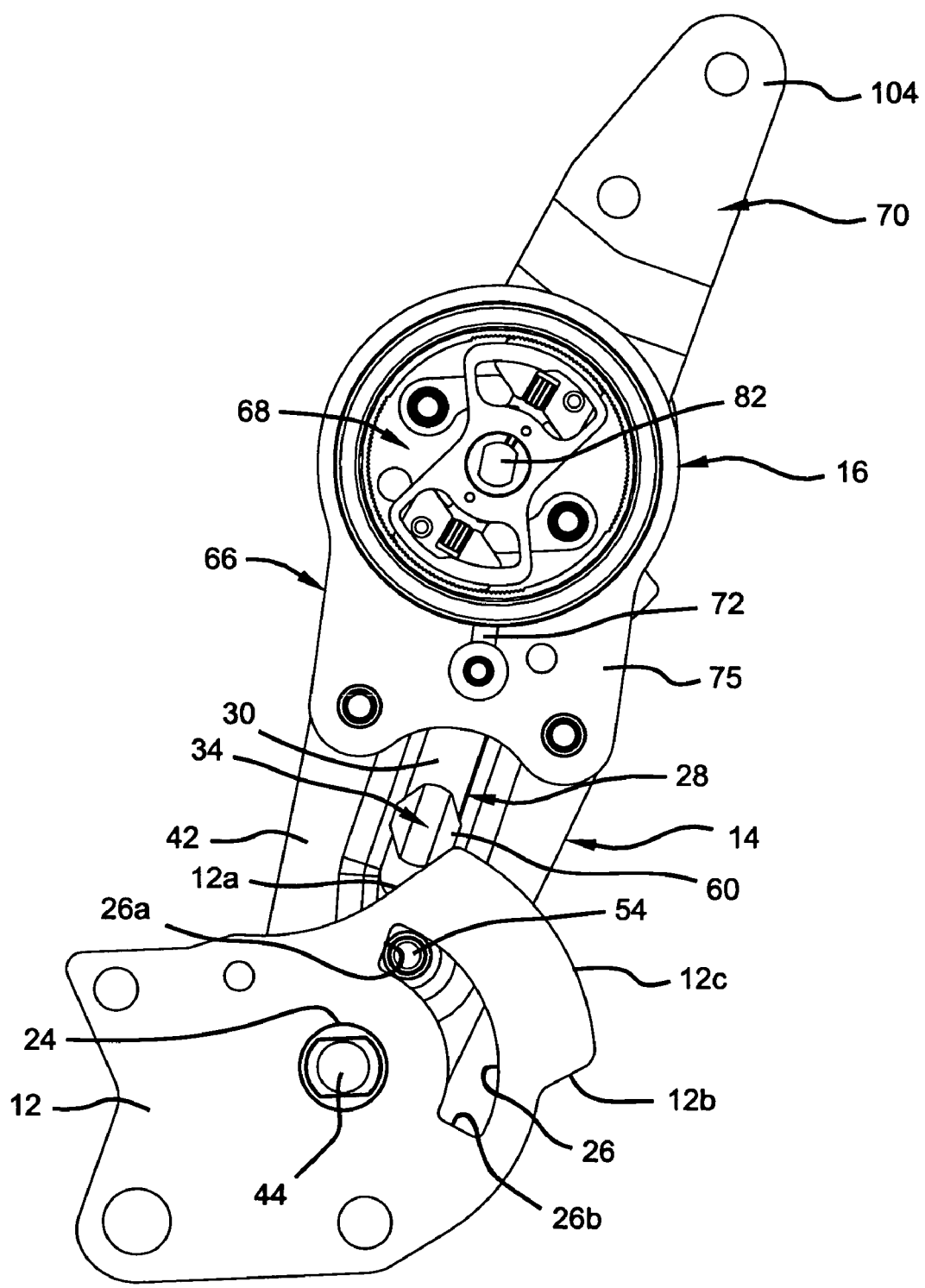
FIG. 2 is a side view of the vehicle seat recliner and folding latch assembly of FIG. 1 with the slide pin sub-assembly and actuation assembly exposed.

The slide pin sub-assembly 14 includes first and second housing plates 40, 42 and a lock assembly 28 (identified in FIG. 2). The first and second housing plates 40, 42 are pivotally supported on a pivot pin 44 disposed in the pivot aperture 24 of the lower quadrant disk 12. The first and second housing plates 40, 42 each include cooperating slide pin cavities 46, 48 and associated lock pin slots 50, 52, each identified in FIG. 3. A stop pin 54 extends between the housing plates 40, 42. The stop pin 54 is disposed in the arcuate slot 26 of the lower quadrant disk 12.

The lock assembly 28 includes first and second lock plates 30, 32, a lock pin 34, and first and second bearings 36, 38. The first and second lock plates 30, 32 include first and second lock pin apertures 56, 58. The lock pin 34 includes an octagonal mid region 60 and first and second wing regions 62, 64. The first and second wing regions 62, 64 engage the lock pin apertures 56, 58 of the first and second lock plates 30, 32, respectively. The lock assembly 28, including the lock pin 34 and first and second lock plates 30, 32, is disposed within the cooperating cavities 46, 48 of the housing plates 40, 42 such that the first and second wings 62, 64 further engage the first and second lock pin slots 50, 52. The cooperating cavities 46, 48 are generally larger than the lock plates 30, 32 to enable linear displacement of the lock assembly 28 therein. The first and second bearings 36, 38 are rotatably supported on a bearing pin 76 extending between the first and second lock plates 30, 32 at ends distal to the lower quadrant disk 12.

Figure 3:
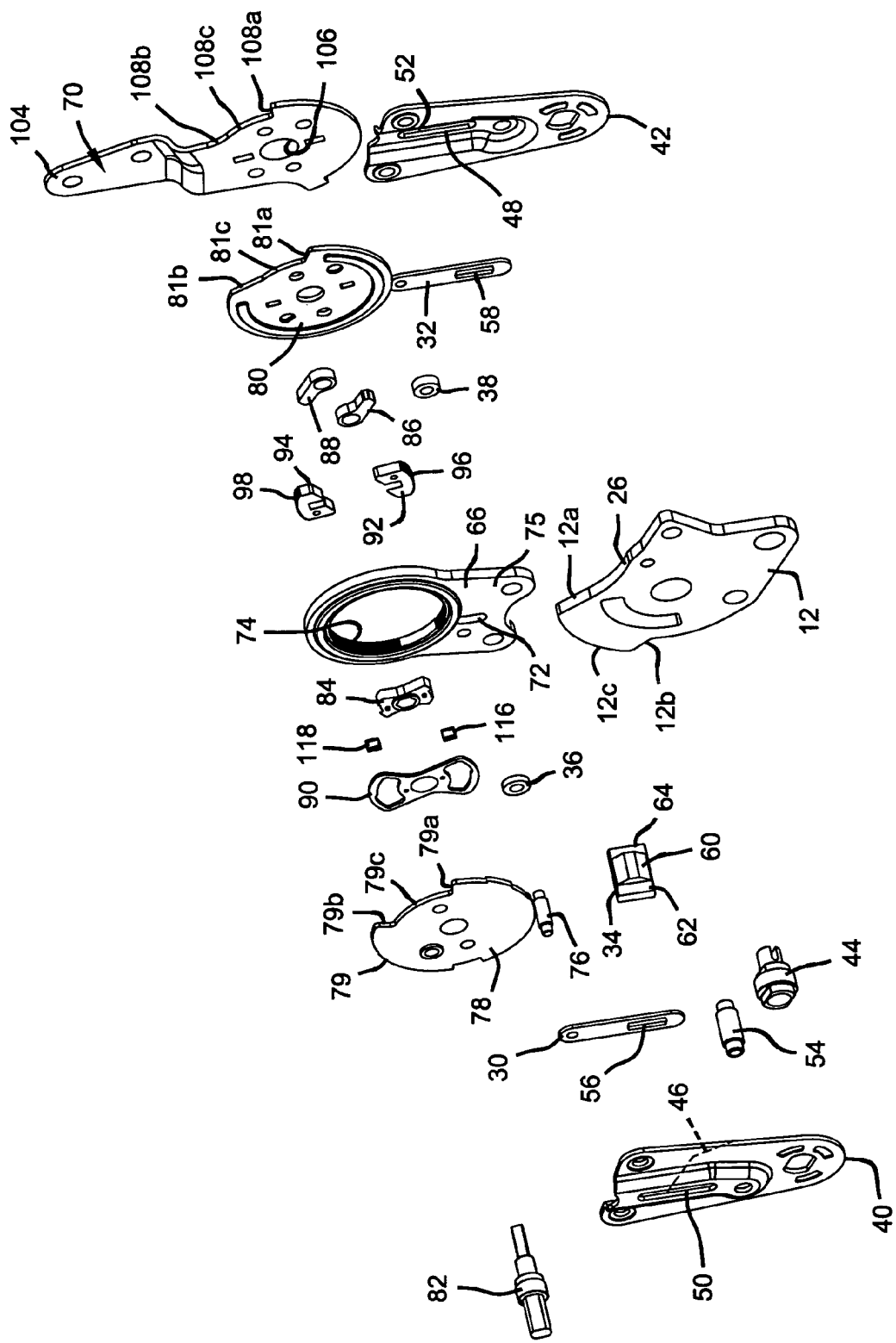
FIG. 3 is an exploded perspective view of the vehicle seat recliner and folding latch assembly of FIG. 1.
Figure 4:
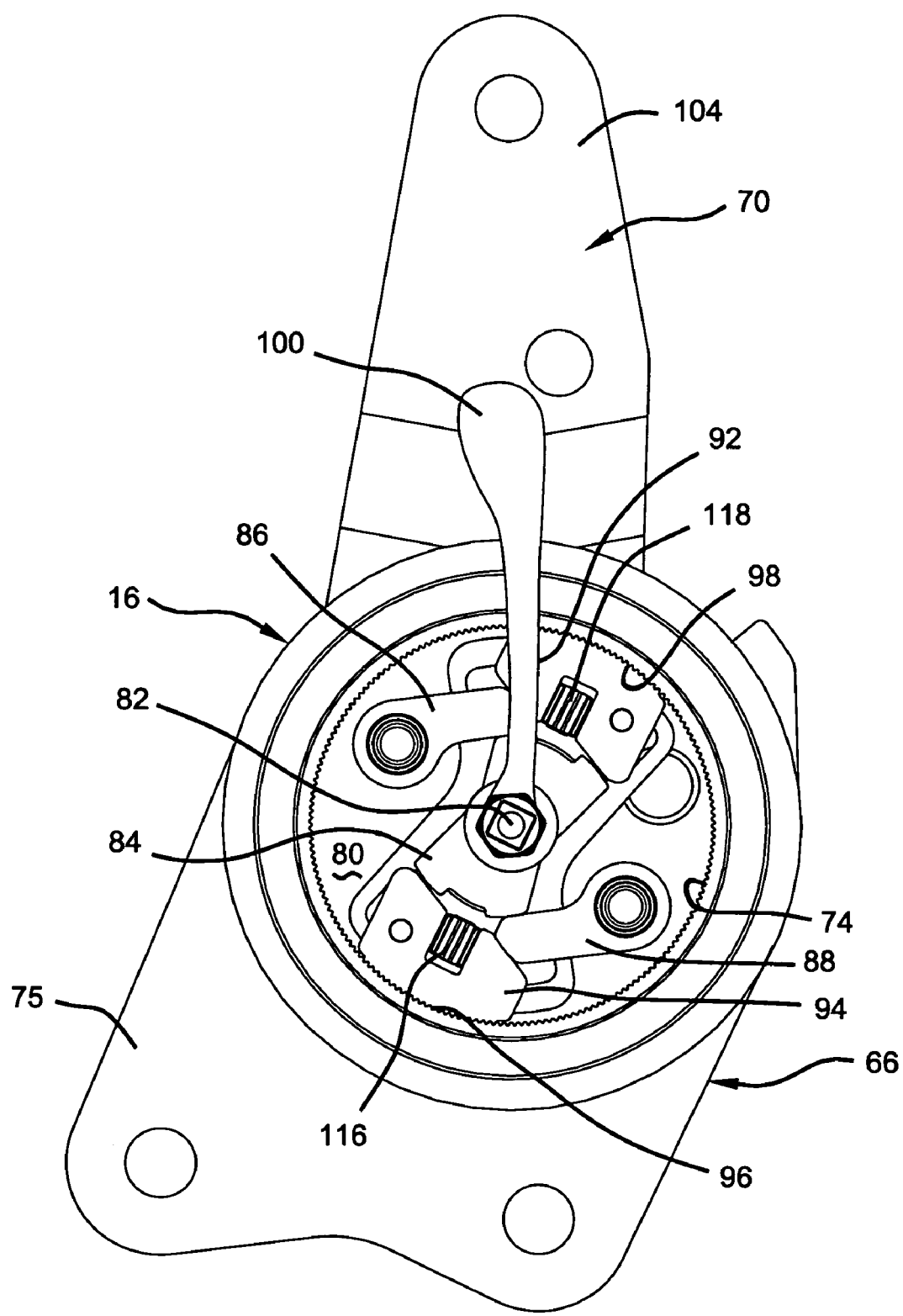
FIG. 4 is a detail view of the recliner mechanism of FIGS. 1–3 in an engaged position.

Referring specifically to FIGS. 3 and 4, the recliner mechanism 16 includes an upper quadrant disk 66, a recliner lower quadrant disk 70 and an actuation assembly 68. The upper quadrant disk 66 includes a bearing slot 72, a toothed aperture 74 and an attachment flange 75. The bearing slot 72 receives the bearing pin 76 of the lock assembly 28. The toothed aperture 74 receives the actuation assembly 68. The attachment flange 75 is attached to the slide-pin subassembly 14 with a pair of fasteners such as threaded fasteners. The recliner lower quadrant disk 70 includes a seat flange 104, an lower quadrant disk aperture 106 and an engagement edge 108. The recliner lower quadrant disk 70 is adapted to pivot relative to the upper quadrant disk 66. The engagement edge 108 includes a first locking shoulder 108a, a second locking shoulder 108b and a void edge 108c.

With reference to FIGS. 2–4, the actuation assembly 68 includes first and second housing disks 78, 80, a main pivot 82, a primary cam 84, first and second locking cams 86, 88, a release cam 90, first and second pawls 92, 94, and a lever 100 (shown in FIG. 4). The housing disks 78, 80, primary cam 84, and release cam 90 are all rotatably supported on the main pivot 82. Additionally, the housing disks 78, 80 include engagement edges 79, 81 in rolling engagement with the bearings 36, 38, respectively, of the lock assembly 28. The engagement edges 79, 81 each include first locking shoulders 79a, 81a, second locking shoulders 79b, 81b and void edges 79c, 81c, respectively, for actuating the slide-pin subassembly 14.

The first and second locking cams 86, 88 are also supported for rotational displacement on the second housing disk 80. The first and second pawls 92, 94 are supported for linear displacement on the second housing disk 80 and are engaged by the locking cams 86, 88, respectively. The first and second pawls 92, 94 further include toothed surfaces 96, 98 adapted to selectively engage the toothed aperture 74 of the upper quadrant disk 66. Furthermore, the pawls 92, 94 are biased out of engagement with the toothed aperture 74 of the upper quadrant disk 66 by biasing members 116, 118. The actuation assembly 68 is adapted to rotate relative to the upper quadrant disk 66 when the pawls 92, 94 are disengaged from the toothed aperture 74. The lever 100 is pivotally attached to the main pivot 82 and adapted to engage and/or disengage the actuation assembly 68.

Figure 5A:
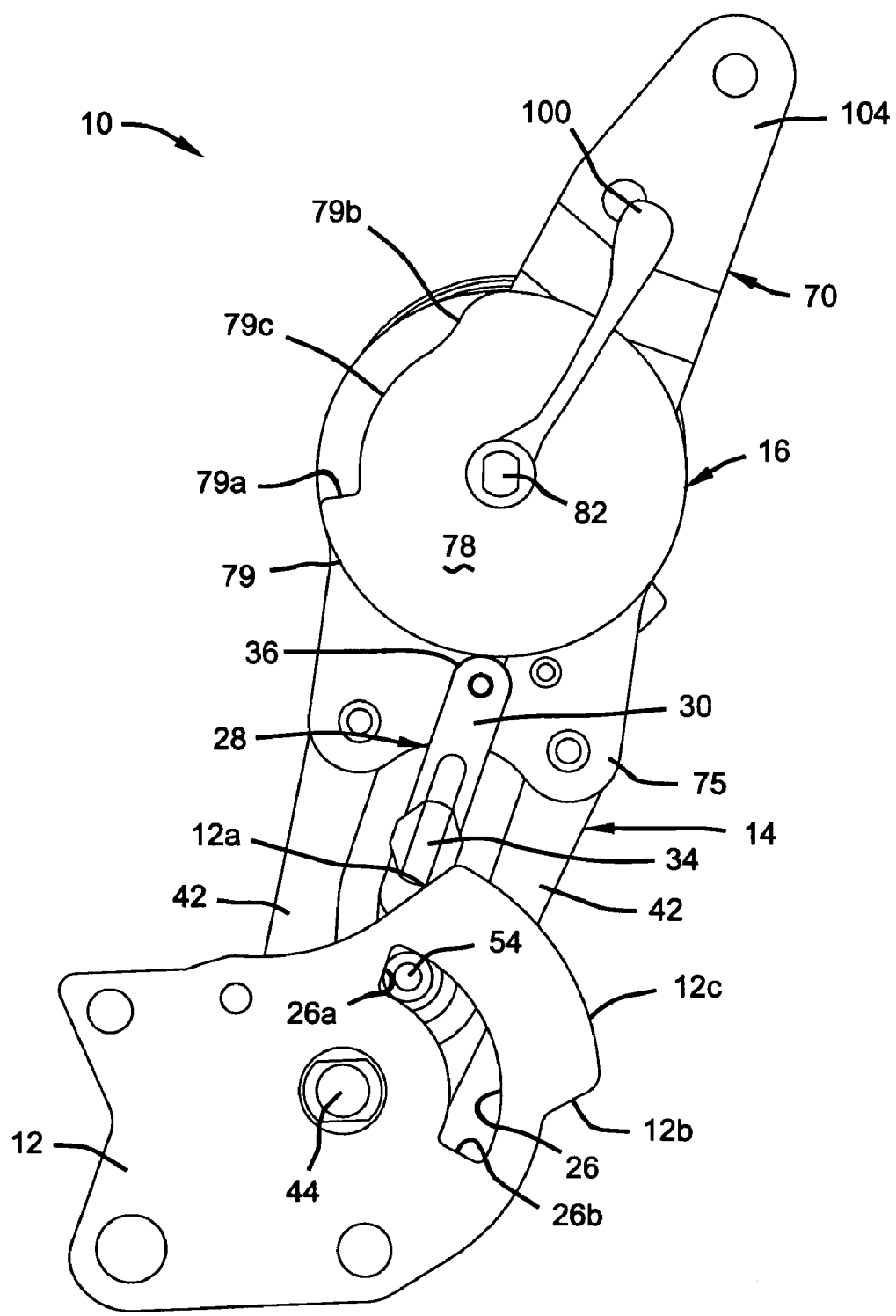
FIG. 5A is a side view of the vehicle seat recliner and folding latch assembly of the present invention, wherein the slide pin sub-assembly is locked in a first position.
Figure 5B:
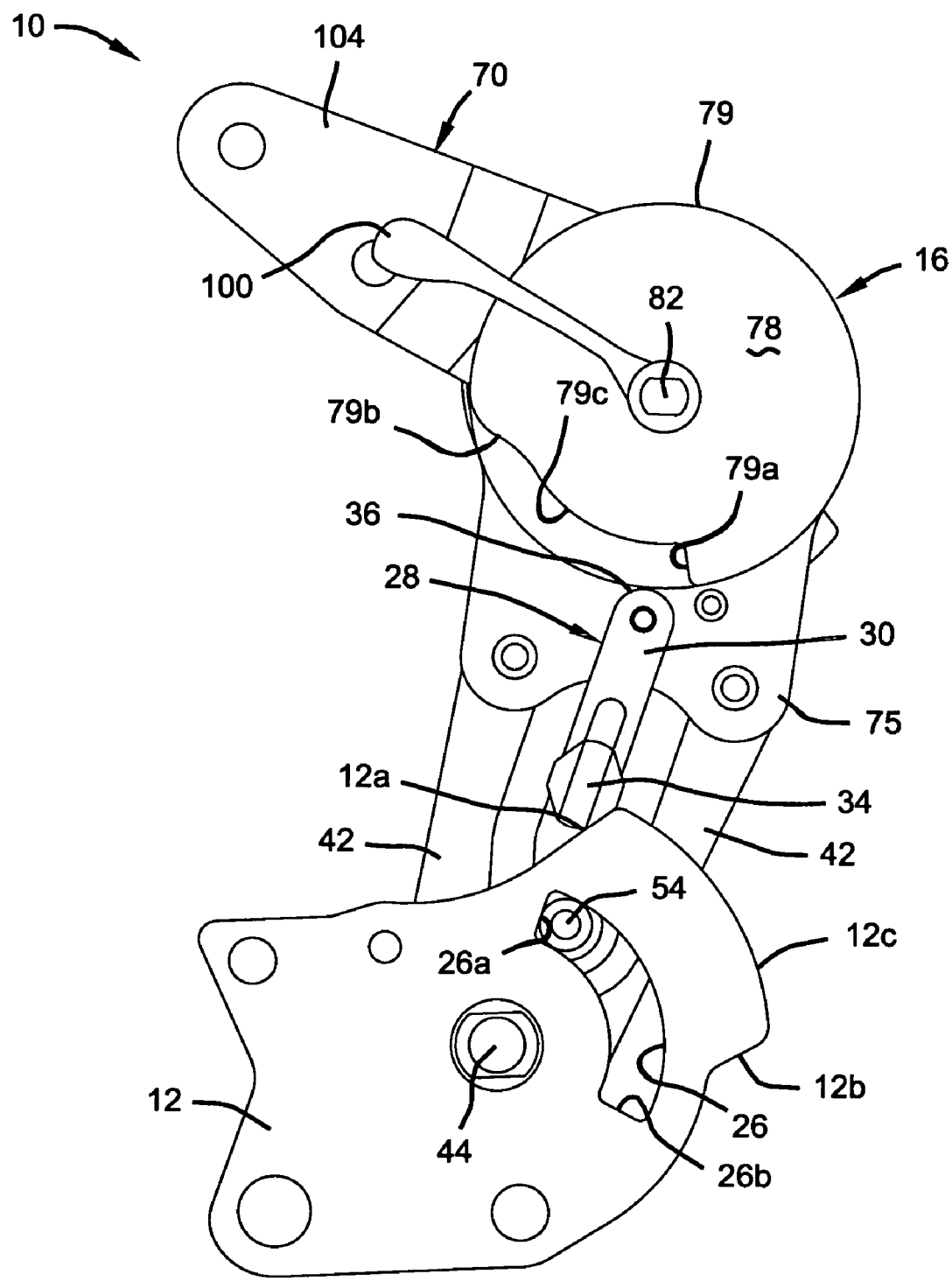
FIG. 5B is a side view of the vehicle seat recliner and folding latch assembly of the present invention, wherein the slide pin sub-assembly is unlocked in a first position.
Figure 5C:
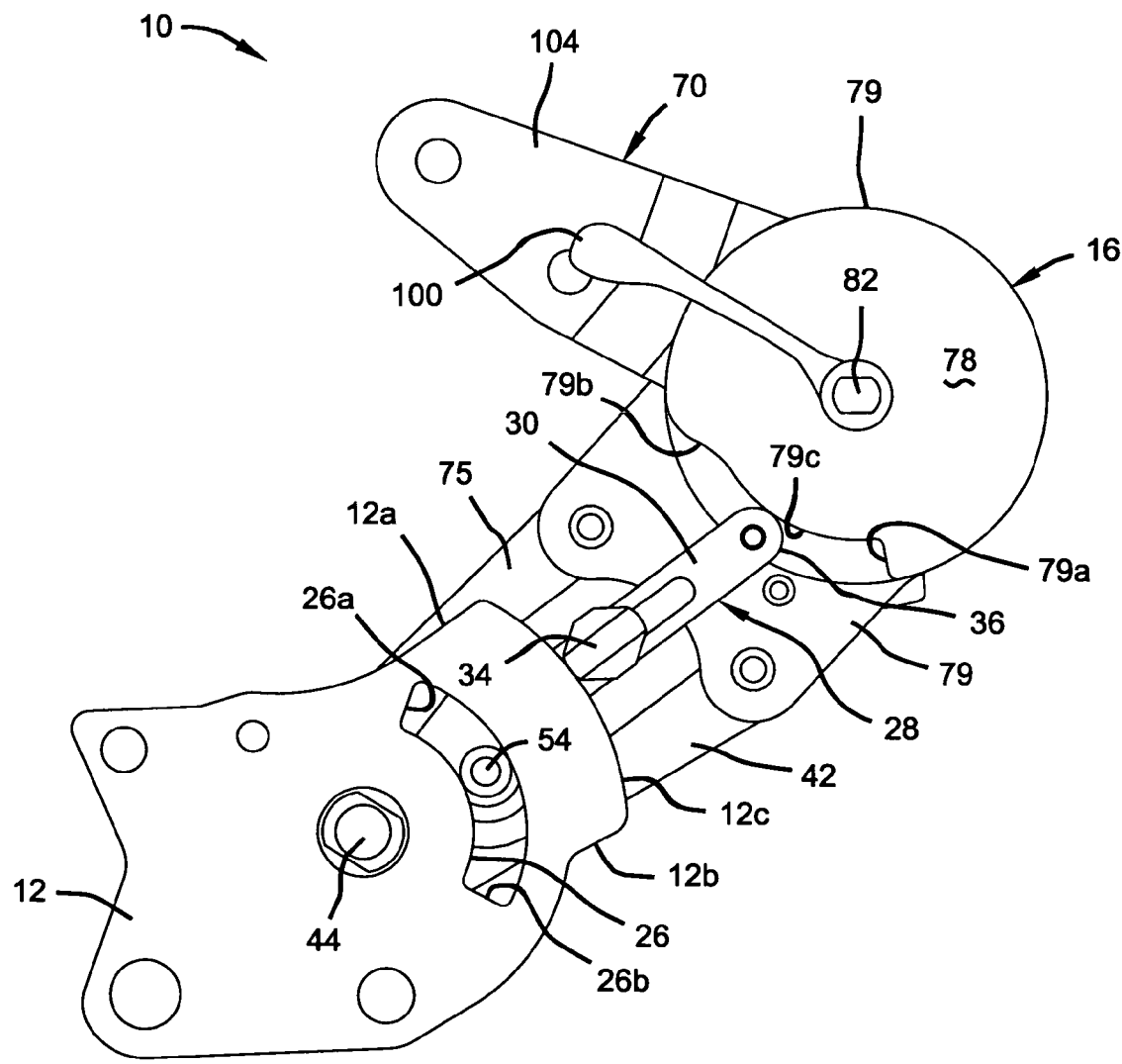
FIG. 5C is a side view of the vehicle seat recliner and folding latch assembly of the present invention, wherein the slide pin sub-assembly is in an intermediate position.
Figure 5D:
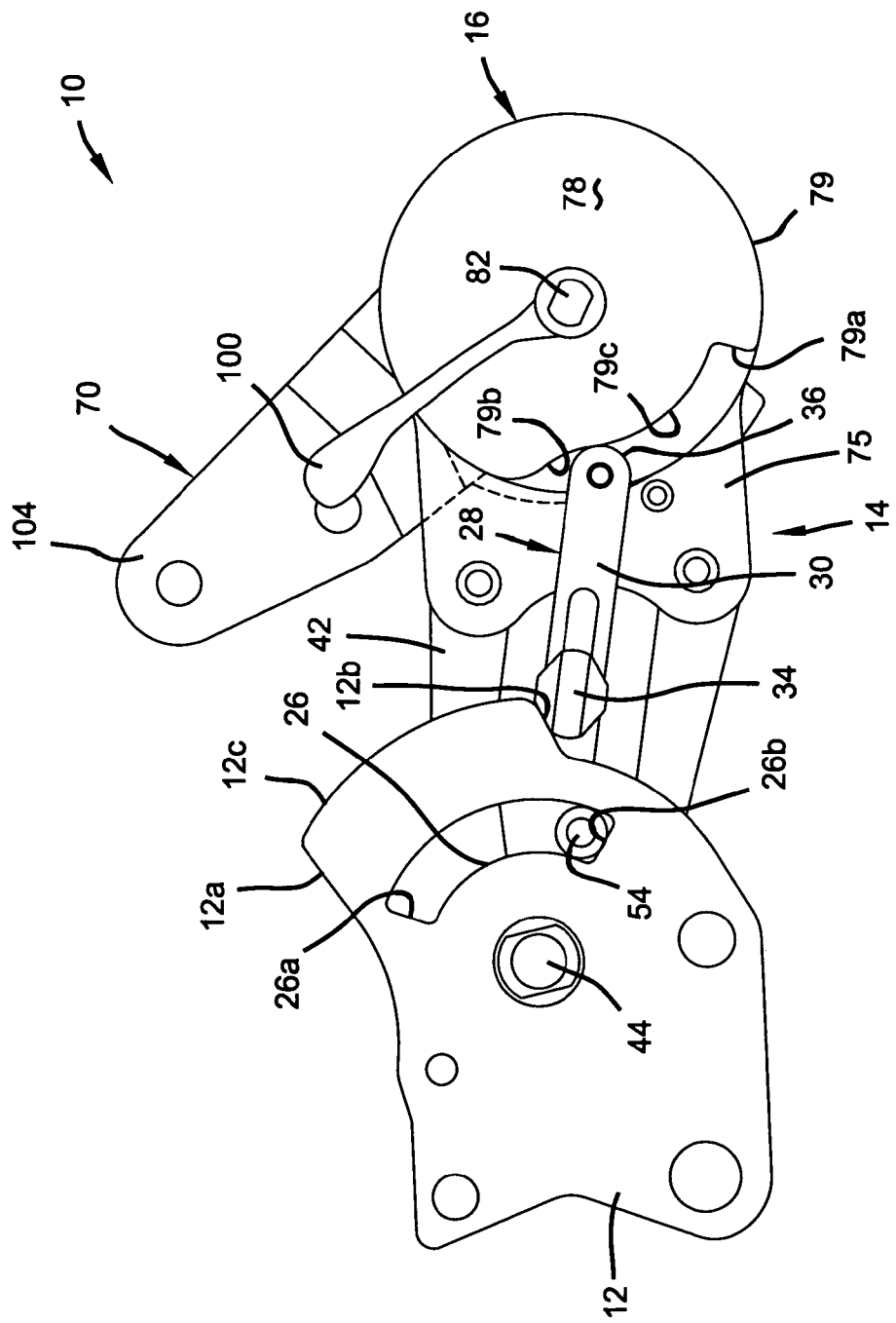
FIG. 5D is a side view of the vehicle seat recliner and folding latch assembly of the present invention, wherein the slide pin sub-assembly is in a second position.
Figure 5E:
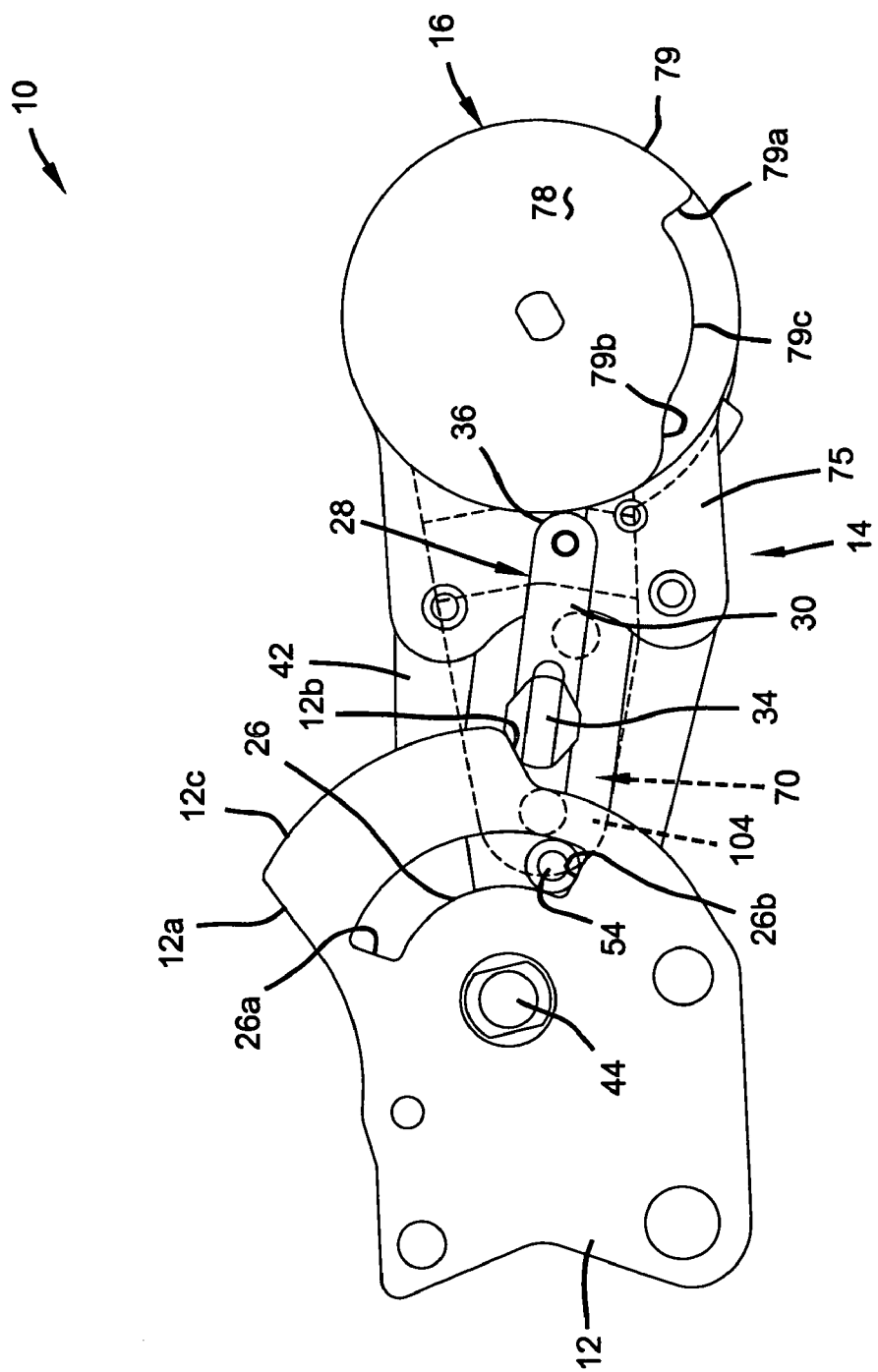
FIG. 5E is a side view of the vehicle seat recliner and folding latch assembly of the present invention, wherein the slide pin sub-assembly is locked in a second position.

With reference now to FIGS. 5A–5E, the operation of the vehicle seat recliner and folding latch assembly 10 of the present invention is described. FIG. 5A illustrates the vehicle seat recliner and folding latch assembly 10 in a first position. This first position is the operating or seating position of the assembly 10. As is illustrated, the lock pin 34 is engaged with the first thrust shoulder 12a on the lower quadrant disk 12. Additionally, the first bearing 36 of the slide pin sub-assembly 14 is engaged with the engagement edge 79 of the first housing plate 78. Furthermore, although not shown in FIG. 5, the second bearing 38 is engaged with the engagement edges 80, 108 of the second housing disk 80 and recliner lower quadrant disk 70. The recliner mechanism 16 blocks this feature in FIG. 5. Lastly, the stop pin 54 is in engagement with the first end 26a of the arcuate slot 26. In this position, the lock pin 34 prevents the slide pin sub-assembly 14 from pivoting in the clockwise direction and the stop pin 54 prevents the slide-pin subassembly 14 from pivoting in the counterclockwise direction.

The lever 100 is slightly pivoted in a clockwise direction to enable movement of the slide-pin subassembly 14 relative to the lower quadrant disk 12. The lever 100 displaces the primary cam 84 in the clockwise direction. The biasing members 116, 118 displace the pawls 92, 94 from the toothed aperture 74 of the upper quadrant disk 66 toward the main pivot 82. This disengages the actuation assembly 68 and enables rotation of the recliner mechanism 16, including the first and second housing disks 78, 80 and recliner lower quadrant disk 70, relative to the upper quadrant disk 66.

Referring to FIG. 5B, the housing plates 78, 80 and recliner disk 70 have been rotated such that the first locking shoulders 70a, 79a, 81a are aligned with the bearings 36, 38 on the slide pin sub-assembly 14. In this position, the lock pin 34 no longer prevents the slide pin sub-assembly 14 from pivoting in a clockwise direction. Hence, a slight moment applied to the slide pin sub-assembly 14 enables the first thrust shoulder 12a on the lower quadrant disk 12 to linearly displace the lock assembly 28 within the lock pin slots 50, 52 in the housing plates 40, 42, thereby enabling displacement of the assembly 10 toward the position shown in FIG. 5C.

FIG. 5C illustrates the vehicle seat recliner and folding latch assembly 10 in an intermediate position. The lock pin 34 has been disengaged from the first thrust surface 12a and now rests on the cammed surface 12c of the lower quadrant disk 12. Consequently, the first and second bearings 36, 38 rollingly engage the void edges 70c, 79c, 81c of the recliner disk 70 and housing disks 78, 80. A further moment applied to the slide pin sub-assembly 14 displaces the assembly 10 toward the position shown in FIG. 5D.

FIG. 5D illustrates the vehicle seat recliner and folding latch assembly 10, wherein the recliner lower quadrant disk 104 is in an intermediate position and the slide pin sub-assembly 14 is in a second position. The stop pin 54 is in engagement with the second end 26b of the arcuate slot 26 in the lower quadrant disk 12. This prevents the slide-pin subassembly 14 from pivoting further in the clockwise direction. Additionally, the lock pin 34 is aligned with the second thrust surface 12b of the lower quadrant disk 12. The first and second roller bearings 36, 38 maintain engagement with the void edges 70c, 79c, 81c of the recliner disk 70 and housing disks 78, 80. Further counterclockwise displacement of the recliner mechanism forces the second locking shoulders 70b, 79b, 81b of the recliner disk 70 and housing plates 78, 80 to displace the lock assembly 28 toward the position shown in FIG. 5E, wherein the slide-pin subassembly is locked in the second position.

To return the assembly 10 to the first position shown in FIG. 5A, the recliner mechanism 16 is actuated by the lever 100 and rotated in the clockwise direction. Rotational displacement of the recliner mechanism 16 enables the second thrust shoulder 12b to displace the lock assembly 28 within the lock pin slots 50, 52 in the housing plates 40, 42 in response to a moment applied to the slide-pin subassembly 14 in the counterclockwise direction. The bearings 36, 38 are consequently displaced to engage the void edges 70c, 79c, 81c of the recliner disk 70 and housing disks 78, 80. This unlocks the assembly 10 such that the lock pin 34 rests on the cammed surface 12c and the slide pin sub-assembly 14 is pivoted in the counterclockwise direction. Once the stop pin 54 engages the first edge 26a of the arcuate slot 26, the slide-pin subassembly 14 stops pivoting. The recliner mechanism 16 is then rotated in the clockwise direction until the first locking shoulders 70a, 79a, 81a displace the lock assembly 28 such that the lock pin 34 engages the first thrust shoulder 12a on the lower quadrant disk 12. This locks the slide pin sub-assembly 14 in the first position described above with reference to FIG. 5A.

Figure 6:
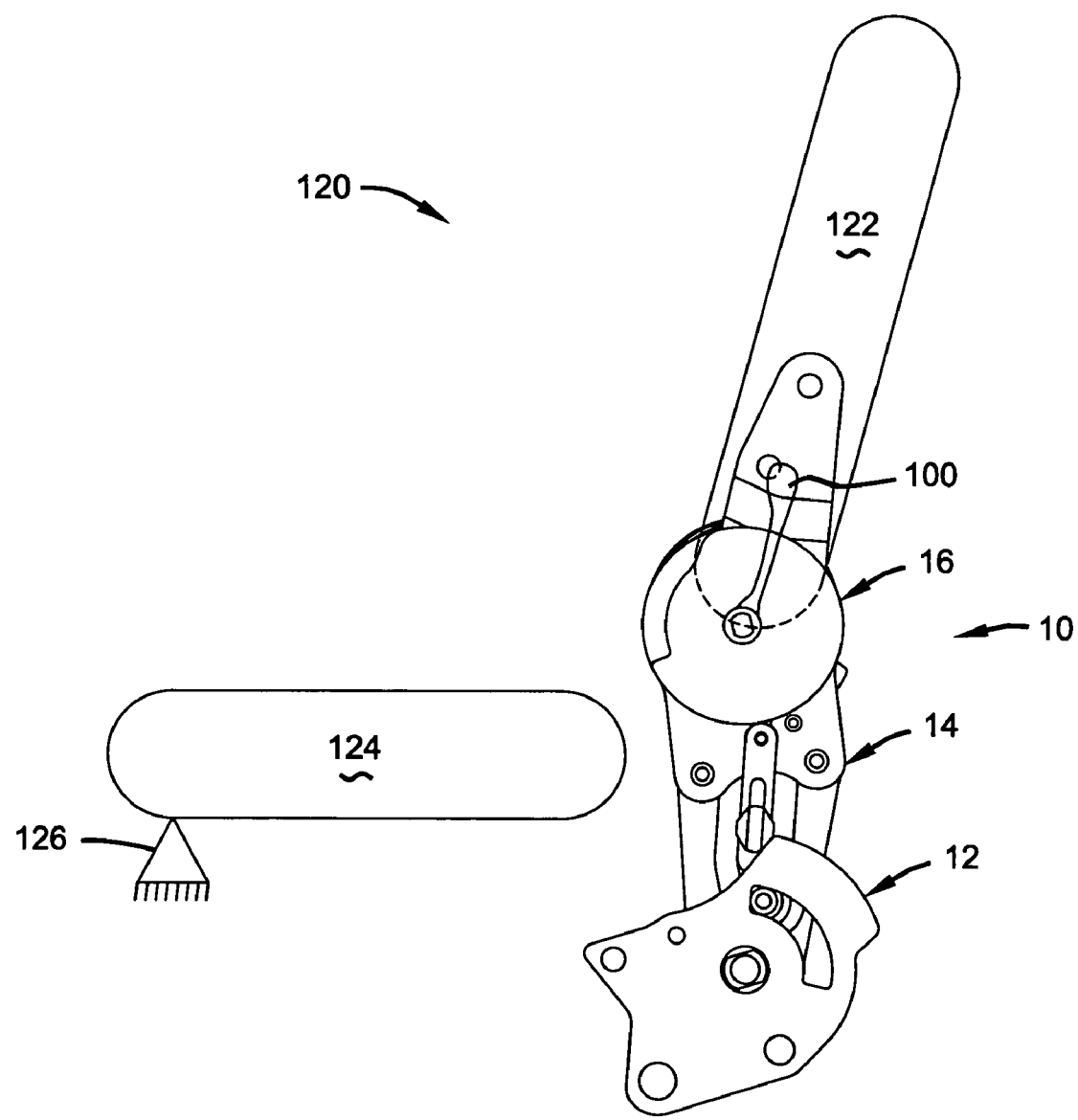
FIG. 6 is a side view of the vehicle seat assembly in accordance with the present invention with the recliner mechanism and slide pin sub-assembly exposed.
Figure 7:
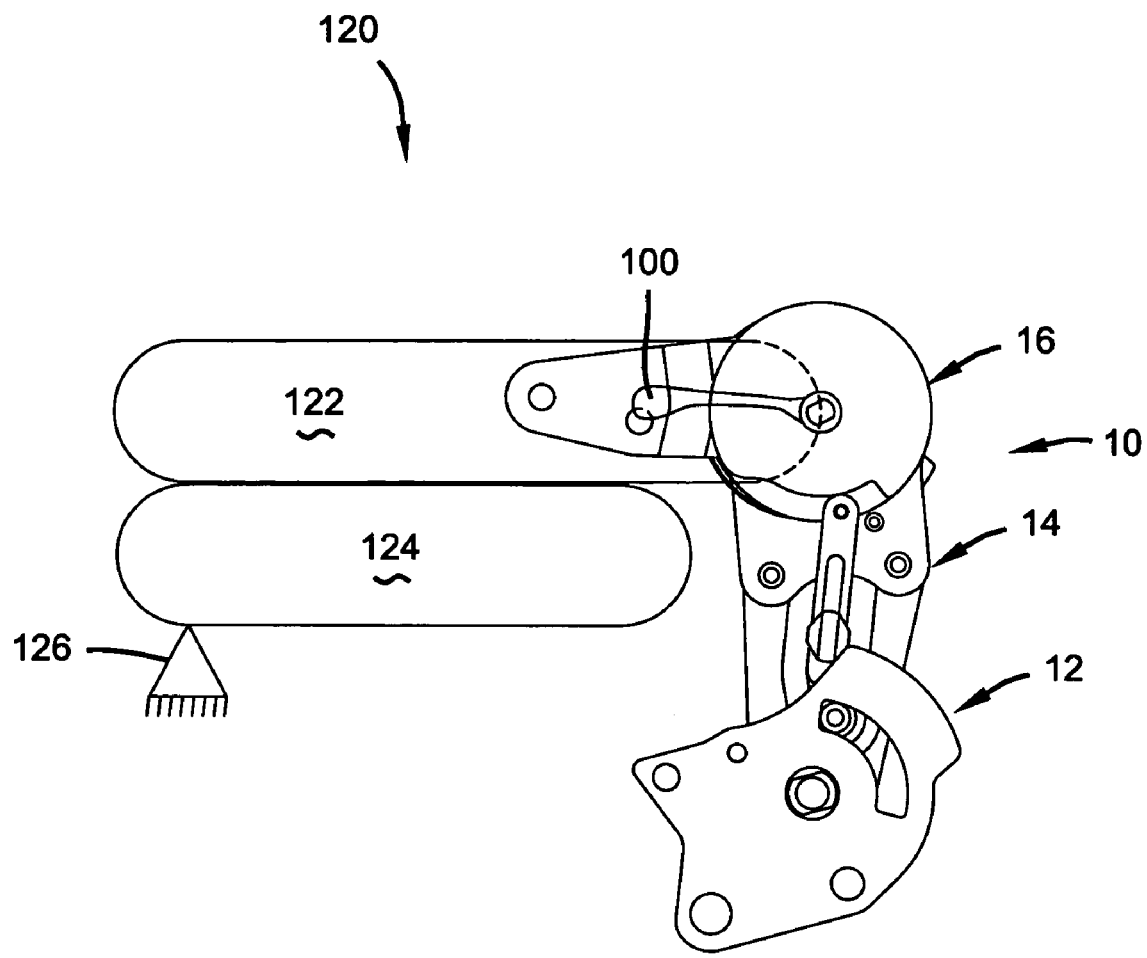
FIG. 7 is a side view of the vehicle seat assembly of FIG. 7 in a fold down position.
Figure 8:
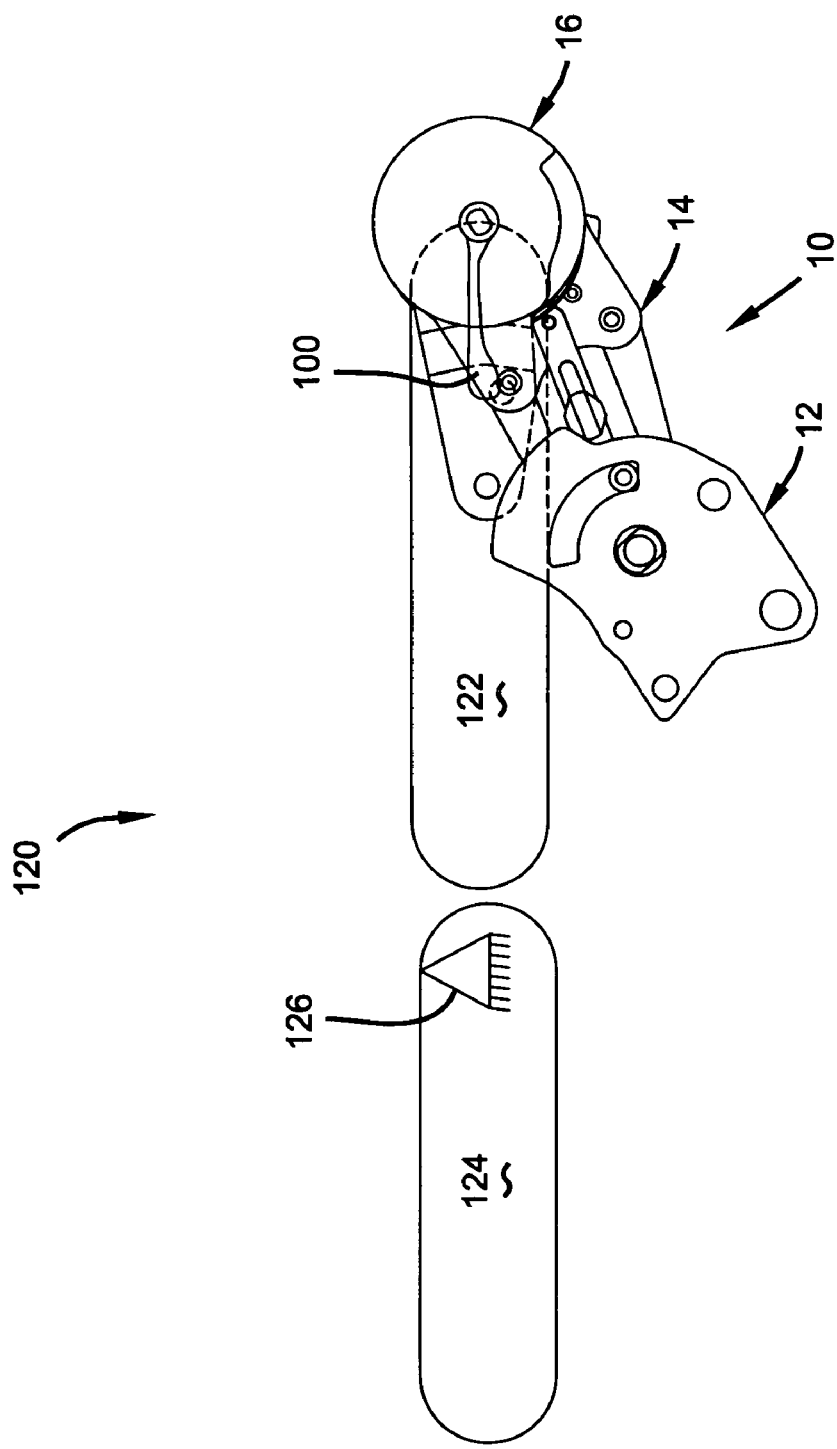
FIG. 8 is a side view of the vehicle seat assembly of FIG. 7 in a load floor position.

With reference now to FIGS. 6–8, a vehicle seat assembly 120 in accordance with the present invention is described. The vehicle seat assembly 120 generally includes a seat back 122, a seat bottom 124 and a vehicle seat recliner and folding latch assembly 10. The vehicle seat recliner and folding latch assembly 10 is identical to that described above. It includes a lower quadrant disk 12, a slide pin sub-assembly 14, and a recliner mechanism 16 and a lever 100. The seat back 122 is attached to the recliner mechanism 16 and adapted for pivotal displacement relative to the seat bottom 124. The seat bottom 124 is attached to a seat pivot 126.

Operation of the vehicle seat assembly 120 mirrors the operation of the vehicle seat recliner and folding latch assembly 10 described above. With reference to FIG. 7, the lever 100 has been pivoted to disengage the actuation assembly 68 of the recliner mechanism 16 and the seat back 122 has been pivoted into a fold down or table top position. In this position, the vehicle seat assembly 120 may be used as a work space for a passenger to the side or behind the vehicle seat assembly 120. It should be appreciated that the lever 100 is constantly aligned with the seat back 122 to provide for an unobstructed table top surface. This is due to the construction of the recliner mechanism 16, which is designed to rotate, as a whole, relative to the slide-pin subassembly 14.

With reference to FIG. 8, the seat bottom 124 has been pivoted 180° about the seat pivot 126 and the seat back 122, via the vehicle seat recliner and folding latch assembly 10, has been displaced into a second position. This configuration provides for a vehicle seat assembly 120 acting as a load floor. This is ideal for enabling a cargo area of a minivan or sport utility vehicle to be loaded with large items. It should be appreciated that the lever 100, as stated above, is constantly aligned with the seat back 122 to provide for an unobstructed load floor surface when the assembly 120 is in the second position.

FIGS. 9–12 depict an alternative vehicle seat recliner and folding latch assembly 128 including an lower quadrant disk 130, a slide-pin subassembly 132, and a recliner mechanism 134. The recliner mechanism 134 is generally identical to the recliner mechanism 16 described above with reference to FIGS. 2–4, except that it des not engagingly actuate the slide-pin subassembly 132 with an engagement edge 108.

The vehicle seat recliner and folding latch assembly 128 generally includes a housing 136 having inner and outer plates 138, 140. The housing 136 is selectively locked relative to the lower quadrant disk 130 by a lock pin 142. The lock pin 142 is selectively engaged by a cam plate 144.

A first end of the lower quadrant disk 130 includes a pawl tooth portion 146 having a plurality of pawl teeth 148. A second end of lower quadrant disk 130 includes a pair of apertures 150 for connecting to a vehicle frame (not shown). The first end of the lower quadrant disk 130 further includes a shoulder 152 having a first thrust surface 154, a cammed surface 156, and a second thrust surface 158. The first thrust surface 154 forms a corner 160 with the lower quadrant disk 130 at a junction with a top surface 162.

Figure 10:
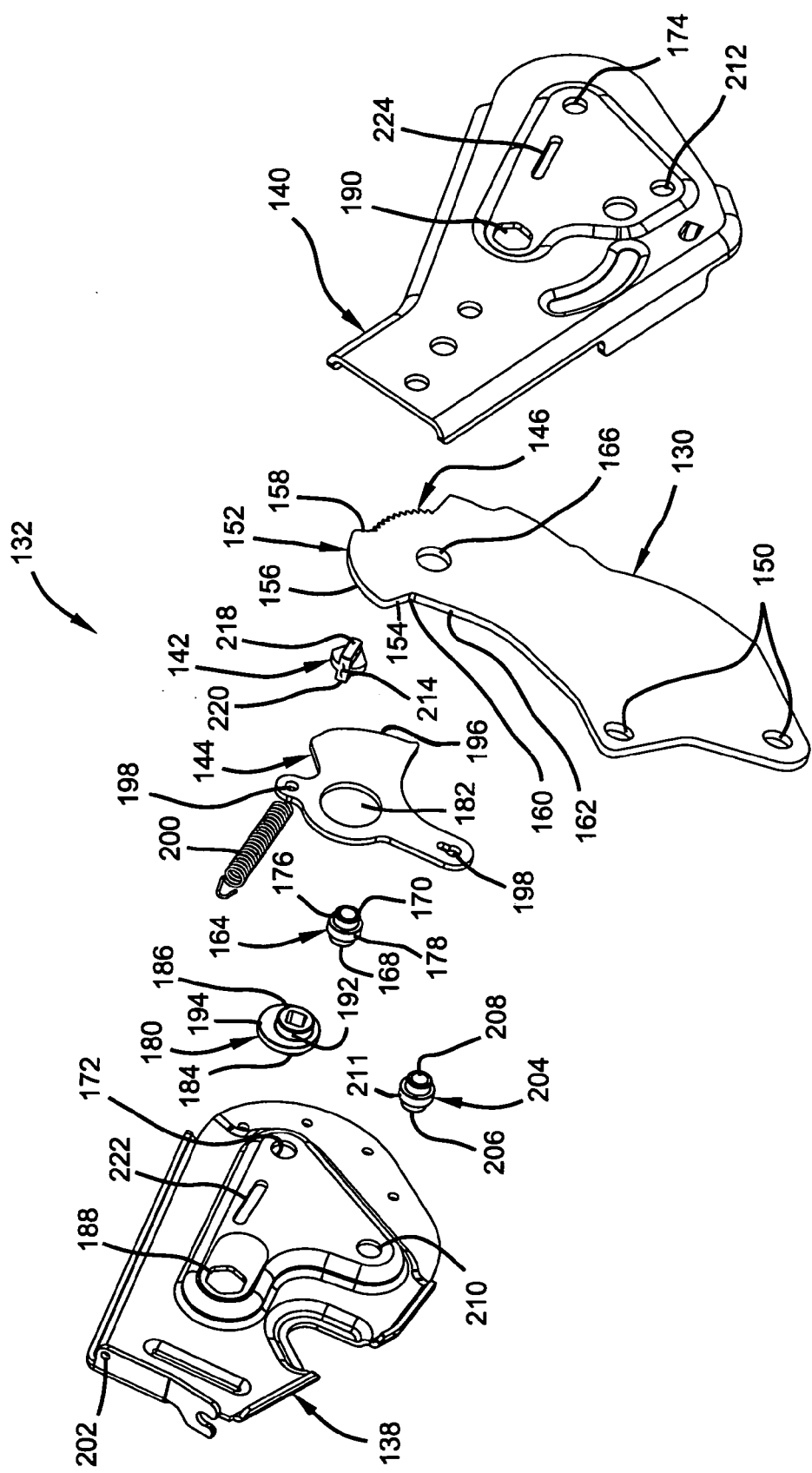
FIG. 10 is an exploded perspective view of the slide-pin subassembly of FIG. 9.

With specific reference to FIG. 10, the lower quadrant disk 130 is disposed between and rotatably supports the inner and outer plates 138, 140 on a first pivot 164. The first pivot 164 is received through an aperture 166 of the lower quadrant disk 130. The first pivot 164 includes first and second cylindrical extensions 168, 170 that are receivable into and supported by first and second apertures 172, 174 in the inner and outer housing plates 138, 140, respectively. The first pivot 164 further includes a support bearing 176 that extends radially and is disposed between the first and second cylindrical extensions 168, 170. The support bearing 176 includes a bearing surface 178 which is received into the aperture 166 for rotatably supporting the housing 136 relative to the lower quadrant disk 130.

The cam plate 144 is also disposed between the inner and outer plates 138, 140 and is rotatably supported by a second pivot 180 received through a central aperture 182 of the cam plate 144. The second pivot 180 includes first and second cylindrical extensions 184, 186 that are received in and supported by first and second apertures 188, 190 in the inner and outer plates 138, 140, respectively. The second pivot 180 also includes a support bearing 192 that extends radially and is disposed between the first and second cylindrical extensions 184, 186. The support bearing 192 includes a bearing surface 194 which is received into the aperture 182 of the cam plate 144 for rotatably supporting the cam plate 144.

One end of the cam plate 144 includes a cammed shoulder 196. An opposite end of the cam plate 144 includes an aperture 198 for anchoring a first end of a spring 200. The inner plate 138 includes an aperture 202 for anchoring a second end of the spring 200. The spring 200 rotationally biases the cam plate 144 in a first rotational direction, which biases the cammed shoulder 196 toward the lock pin 142, which, in turn, is forced toward the corner 160 and against the first thrust surface 154 of the lower quadrant disk 130. In this position, the housing 136 is held in a first upright position relative to the lower quadrant disk 130. A cross member 204 includes cylindrical extensions 206, 208 received into apertures 210, 212, respectively, of the inner and outer plates 138, 140. The cross member 204 includes first and second cylindrical extensions 206, 208 that are received in and supported by apertures 210, 212 in the inner and outer housing plates 138, 140, respectively. The cross-member 204 also includes a surface 211 for contacting the top surface 162 of the lower quadrant disk 130 and prohibiting further rearward rotation of the housing 136.

The lock pin 142 is a wedge-shaped member having an arcuate surface 214 at a wide end for engaging the cammed shoulder 196 of the cam plate 144 and a notch 216 disposed in a narrow end opposite the arcuate surface 214. The notch 216 is adapted to engage the pawl teeth 148 of the lower quadrant disk 130 for locking the housing 136 relative the lower quadrant disk 130. Ribs 218, 220 extend perpendicularly from side faces of the lock pin 142. The ribs 218, 220 are slidably supported within slots 222, 224 of the inner and outer plates 138, 140, respectively, enabling the lock pin 142 to slide therebetween. The lock pin 142 slides in the slots 222, 224 as it interfaces between the lower quadrant disk 130 and the cam plate 144. The cam plate 144 acts on the arcuate surface 214 of the lock pin 142 to bias the lock pin 142 against the lower quadrant disk 130.

Figure 9:
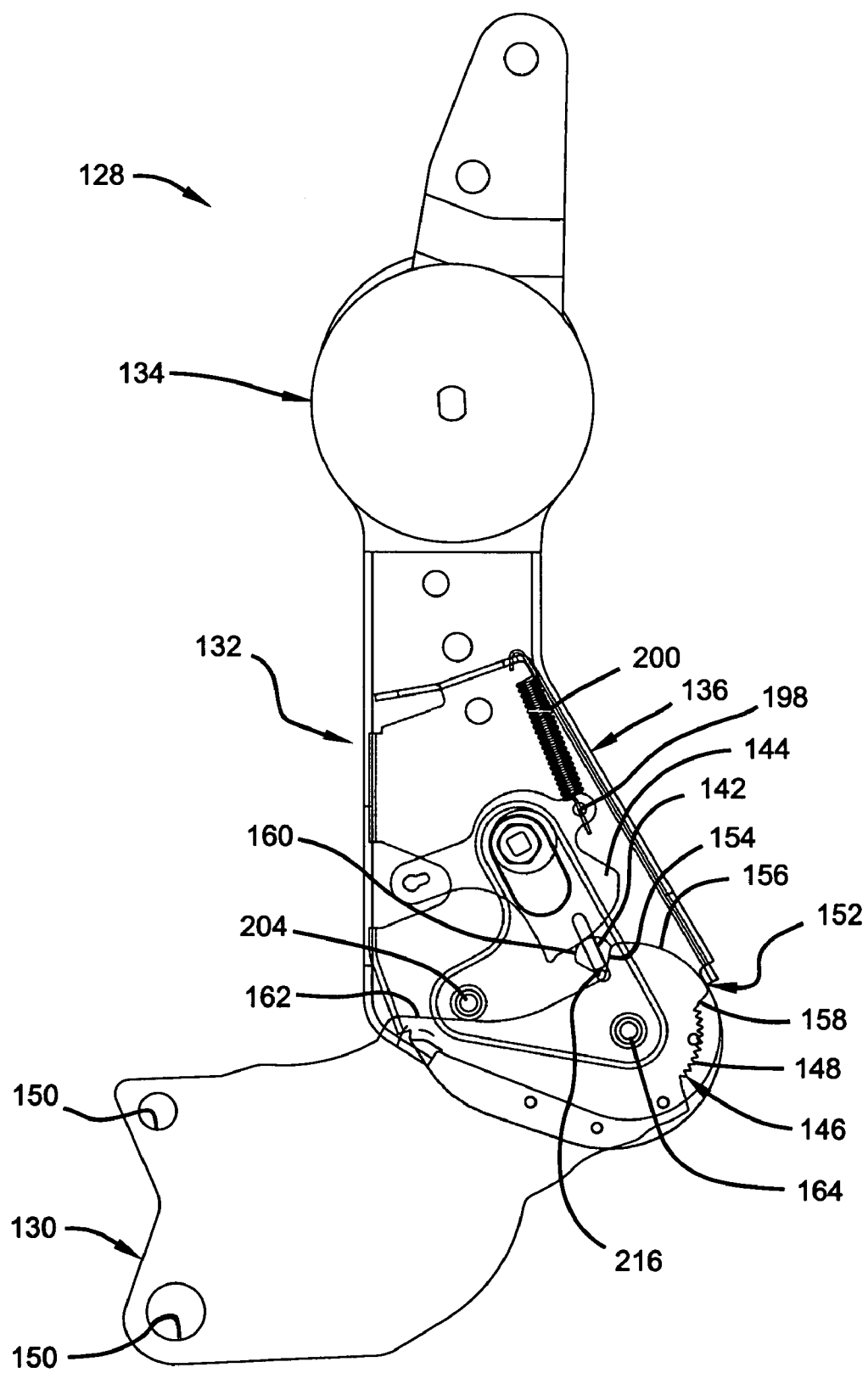
FIG. 9 is a side view of an alternative embodiment of a vehicle seat recliner and folding latch assembly in accordance with the principles of the present invention, wherein the slide-pin subassembly is locked in a first position.
Figure 11:
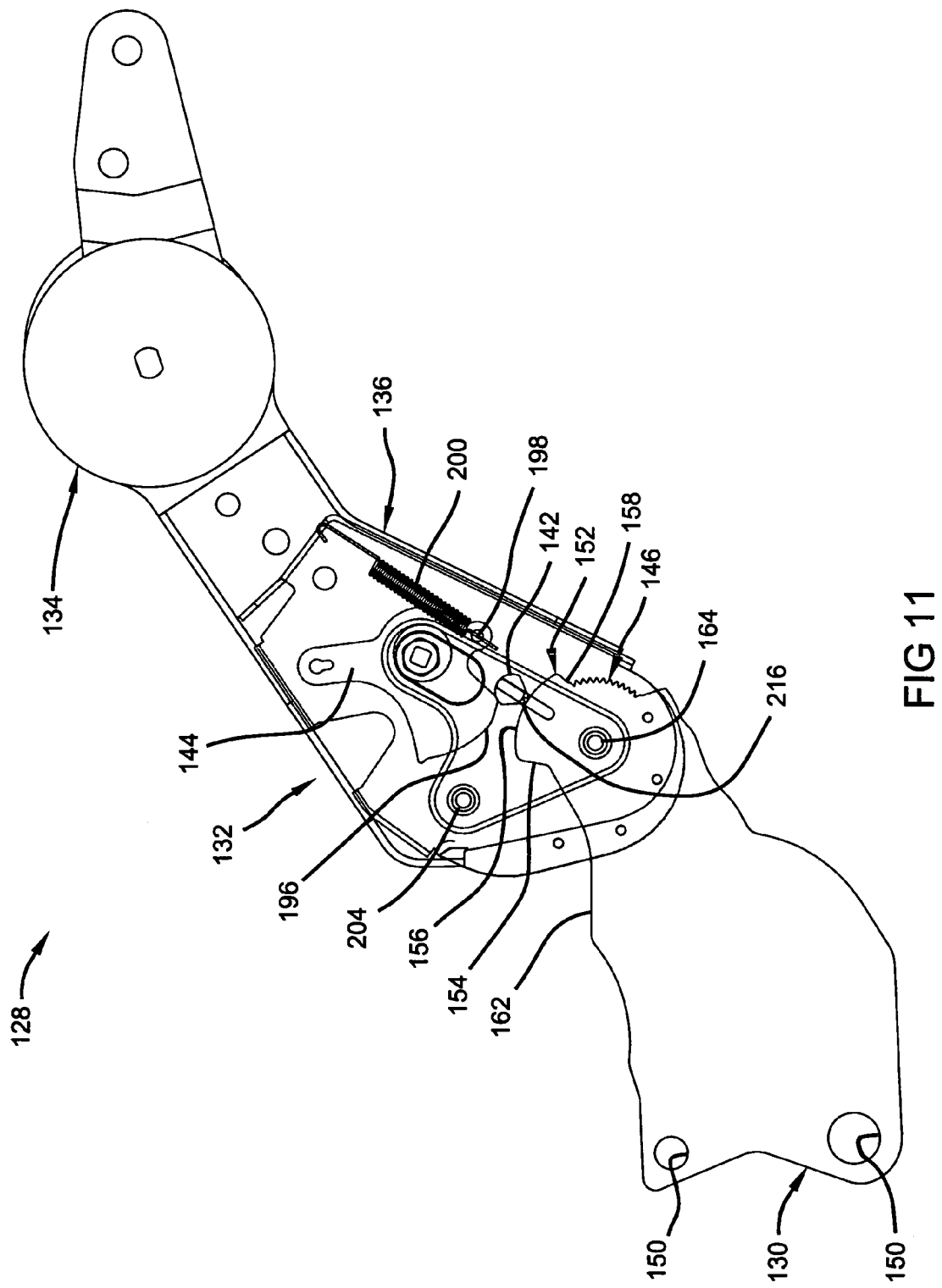
FIG. 11 is a side view of the vehicle seat recliner and folding latch assembly of FIG. 9, wherein the slide-pin subassembly is in an unlocked position.
Figure 12:
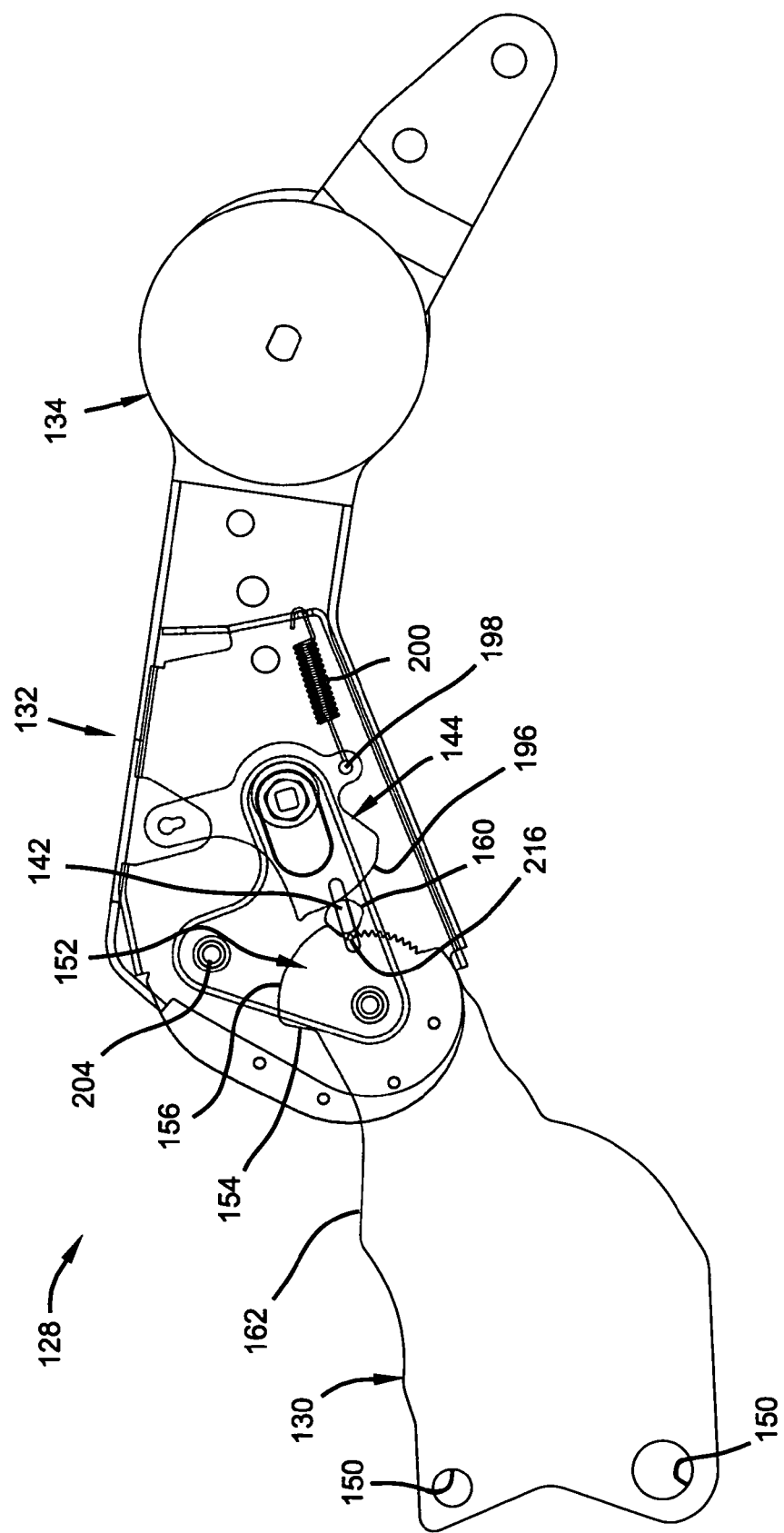
FIG. 12 is a side view of the vehicle seat recliner and folding latch assembly of FIG. 9, wherein the slide-pin subassembly is locked in a rearward position.

With particular reference to FIGS. 9, 11, and 12, the operation of the vehicle seat recliner and folding latch assembly 128 will be described in detail. In a first preferred embodiment, the vehicle seat recliner and folding latch assembly 128 enables the housing 136 to pivot rearward, relative to the lower quadrant disk 130, and lock in a plurality of rearwardly inclined positions. To fold the housing 136 rearward, the cam plate 144 is rotated against the biasing force of the spring 200, forcing the cammed shoulder 196 to slide along and then move away from the arcuate surface 214 of the lock pin 142. Thus, the ribs 218, 220 of the lock pin 142 are free to slide in the slots 222, 224 of the inner and outer housing plates 138, 140 as the lock pin 142 moves from a recessed position adjacent to the first thrust surface 154 to a raised position on the cammed surface 156 of the shoulder 152. Specifically, as the cam plate 144 rotates against the bias of the spring 200, the lock pin 142 is pinched between the first thrust surface 154 of lower quadrant disk 130 and the slots 222, 224. As the cammed shoulder 196 is moved out of locking engagement with the lock pin 142, upward movement of lock pin 142 is unrestricted. As the housing 136 is rotated, the walls defining the slots 222, 224 of the inner and outer housing plates 138, 140 push the lock pin 142 upward within slots 222, 224 until the lock pin 142 slides over onto the cammed surface 156. Continued forward rotation of the housing 136 causes the lock pin 142 to slide along the cammed surface 156, as best seen in FIG. 11. Once the lock pin 142 is on the cammed surface 156, the cam plate 144 may be released, wherein the spring 200 again biases the cam plate 144 in the first rotational direction. The cammed shoulder 196 again biases the lock pin 142 within the slots 222, 224 pushing the lock pin 142 against the cammed surface 156.

Once the housing 136 has rotated sufficiently rearward, the lock pin 142 slides off of the cammed surface 156 and onto the pawl tooth portion 146. Due to the bias of the cam plate 144, the lock pin 142 immediately engages the first pawl tooth, wherein the housing 136 is held in a first rearward inclined position relative to the lower quadrant disk 130.

A plurality of alternative rearward lock positions may be achieved by again operating the cam plate 144 to disengage the arcuate surface 214 of the lock pin 142. Once disengaged, the lock pin 142 is movable across the pawl tooth portion 146 until a desired position has been achieved. Upon achieving a desired position, the cam plate 144 is released, again biasing the lock pin 142 into engagement with a particular tooth of the pawl tooth portion 146.

To return the housing 136 to an upright position, relative to the lower quadrant disk 130, the cam plate 144 is again rotated against the biasing force of spring 200 to disengage the cam plate 144 from the lock pin 142. As the housing 136 rotates forwardly, the lock pin 142 moves from a recessed position adjacent to the second thrust surface 158 to a raised position on the cammed surface 156 of the shoulder 152. Specifically, the lock pin 142 is pinched between the second thrust surface 158 of the lower quadrant disk 130 and the slots 222, 224 until the lock pin 142 slides onto the cammed surface 156 of the lower quadrant disk 130. Once the lock pin 142 is on the cammed surface 156, the cam plate 144 may be released wherein the spring 200 again biases the cam plate 144 in the first rotational direction. Thus, the cammed shoulder 196 biases the lock pin 142 within the slots 222, 224 to force the lock pin 142 against the cammed surface 156. After the housing 136 is rotated sufficiently forward, the bias of the cam plate 144 causes the lock pin 142 to slide within slots 222, 224, toward the corner 160 and against first thrust surface 154, thereby locking the housing 136 in an upright position.

Figure 13:
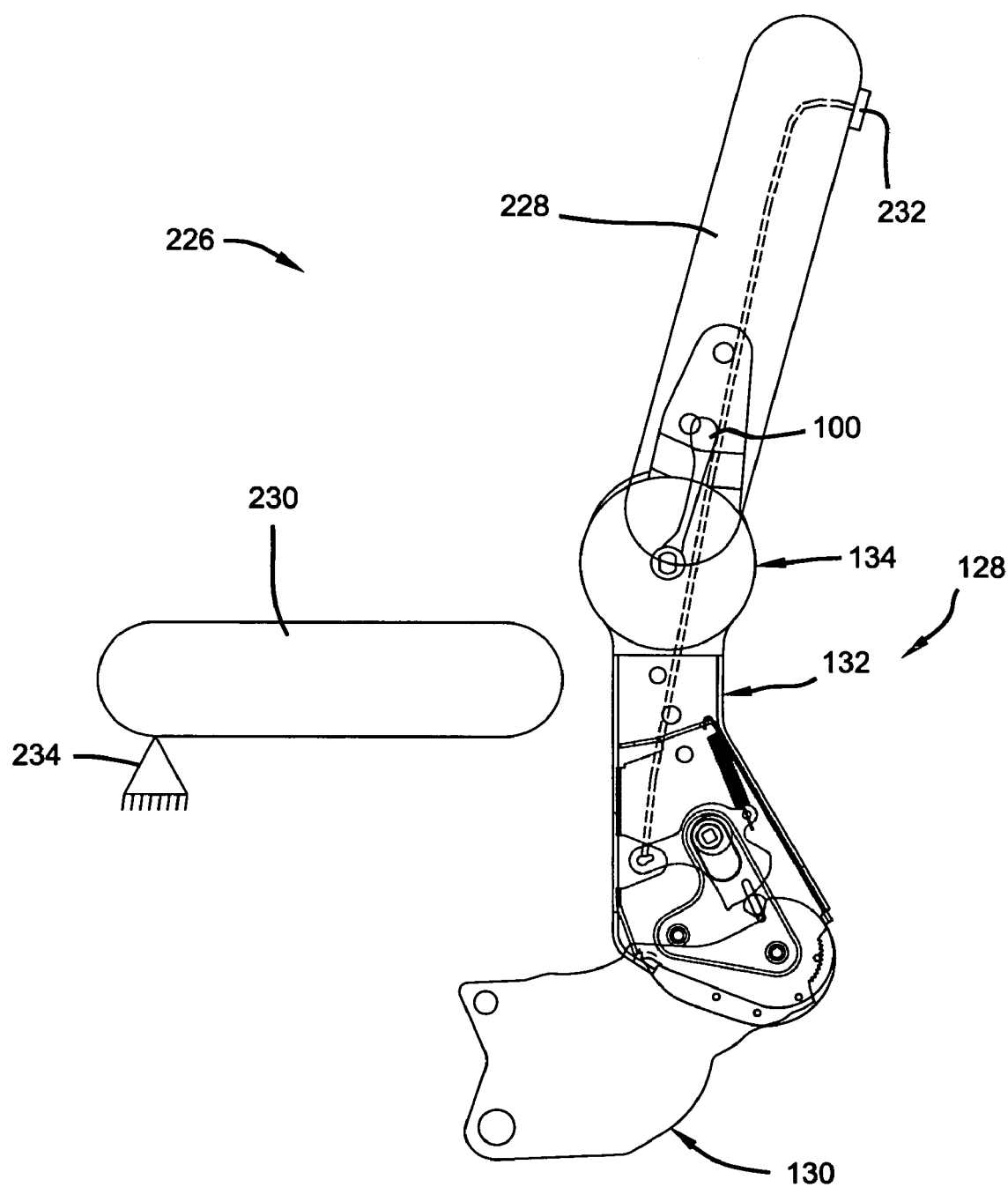
FIG. 13 is a side view of an alternative embodiment of a vehicle seat assembly in accordance with the principles of the present invention.
Figure 14:
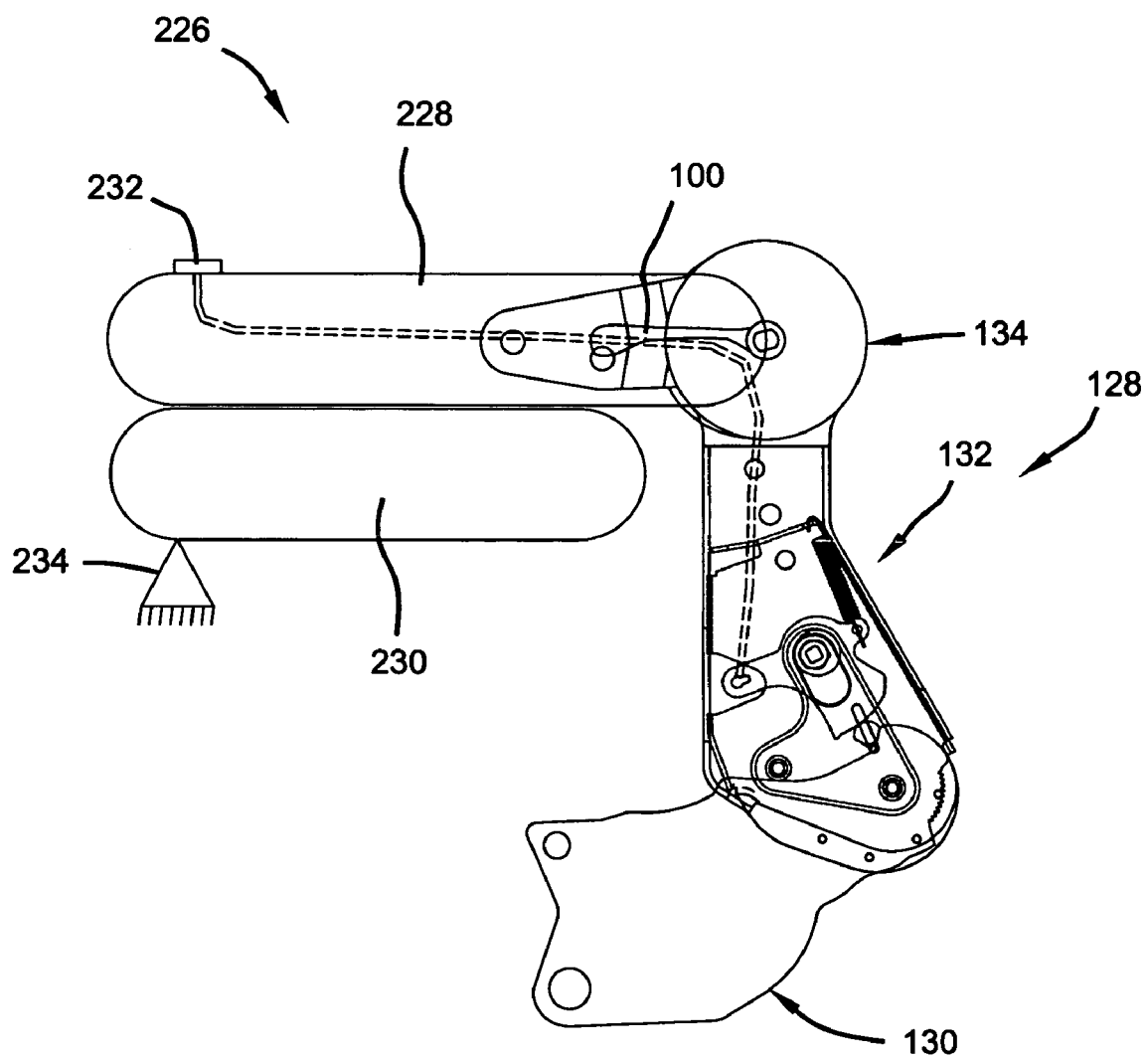
FIG. 14 is a side view of the vehicle seat assembly of FIG. 13 in a fold-down position.
Figure 15:
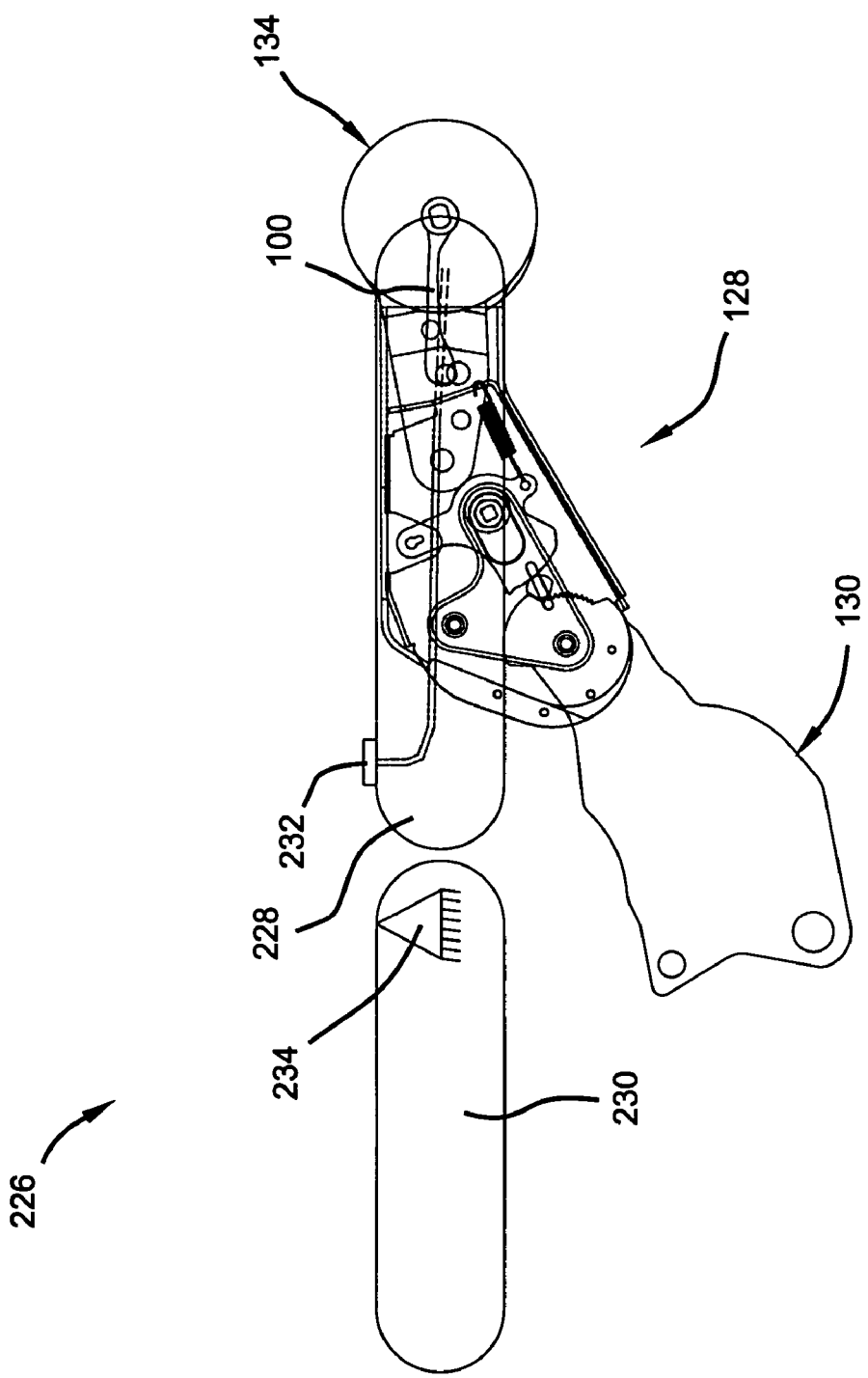
FIG. 15 is a side view of the vehicle seat assembly of FIG. 13 in a load floor position.

With reference now to FIGS. 13–15, a vehicle seat assembly 226 in accordance with the present invention is described. The vehicle seat assembly 226 generally includes a seat back 228, a seat bottom 230 and a vehicle seat recliner and folding latch assembly 128. The vehicle seat recliner and folding latch assembly 128 includes an lower quadrant disk 130, a slide pin sub-assembly 132, and a recliner mechanism 134. Additionally, the vehicle seat recliner and folding latch assembly 128 includes a lever 232 for actuating the slide pin subassembly 132. The seat back 228 is attached to the recliner mechanism 134 and adapted for pivotal displacement relative to the seat bottom 230. The seat bottom 230 is attached to a seat pivot 234.

The general operation of the vehicle seat assembly 226 mirrors the operation of the vehicle seat assembly 120 described above with reference to FIGS. 6–8. Furthermore, the vehicle seat recliner and folding latch assembly 128 operates identical to that described above with reference to FIGS. 9, 11 and 12.

With reference to FIG. 14, the recliner mechanism 134 has been disengaged and the seat back 228 pivoted into a fold down or table top position. In this position, the vehicle seat assembly 226 may be used as a work space for a passenger to the side or behind the vehicle seat assembly 226. It should be appreciated that the recliner mechanism 134 includes a lever 100 similar to recliner mechanism 16 described above, that is constantly aligned with the seat back 228.

With reference to FIG. 15, the seat bottom 230 has been pivoted 180° about the seat pivot 234 and the seat back 228, via the vehicle seat recliner and folding latch assembly 128, and has been displaced into a second position such that the seat back 228 occupies the area previously occupied by the seat bottom 230. This configuration provides for a vehicle seat assembly 226 acting as a load floor. This is ideal for enabling a cargo area of a minivan or sport utility vehicle to be loaded with large items. To obtain this position, the recliner mechanism 134 is actuated to release the seat back 228. The lever 232 is lifted to rotate the cam plate 144 via a cable extending down through the seat back 228 to the aperture 198. This disengages the lock pin 142 from the lower quadrant disk 130, enabling the housing 136 to pivot rearward relative to the lower quadrant disk 130 as described above with reference to FIGS. 9, 11 and 12. Once the housing 136 pivots sufficiently rearward the recliner mechanism 134 may be re-engaged to lock the seat back 228 in the position illustrated in FIG. 15.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle seat assembly comprising:
   a seat back;
   a lower quadrant disk adapted to be fixedly supported by a vehicle;

a recliner mechanism pivotally supported on said lower quadrant disk for pivoting said seat back between a first position and a second position relative to said lower quadrant disk; and a slide-pin subassembly pivotally supporting said recliner mechanism on said lower quadrant disk and pivotally supported for rotation between a third position and a fourth position relative to said lower quadrant disk, said slide-pin subassembly including a lock pin that selectively engages said lower quadrant disk to lock said slide-pin subassembly relative to said lower quadrant disk.

2. The seat assembly of claim 1 wherein said seat back is in an upright position when said slide-pin subassembly is in said third position and said recliner mechanism is in said first position.

3. The seat assembly of claim 1 wherein said seat back is in a fold down position when said slide-pin subassembly is in said third position and said recliner mechanism is in said second position.

4. The seat assembly of claim 1 wherein said seat back is in a load floor position when said slide-pin subassembly is in said fourth position and said recliner mechanism is in said second position.

5. The seat assembly of claim 1 wherein said slide-pin subassembly includes:
a housing; and
a cam plate rotatably supported by said housing for positioning said lock pin relative to said lower quadrant disk.

6. The vehicle seat assembly of claim 1 wherein movement of said slide-pin subassembly causes concurrent movement of said recliner mechanism relative to said lower quadrant disk.

7. A vehicle seat recliner assembly, comprising:
a lower quadrant disk;
a slide-pin subassembly supported on said lower quadrant disk for pivotal displacement between a first position and a rearward position, said slide-pin subassembly including:
a housing;
a lock pin slidably supported by said housing and engaging said lower quadrant disk, whereby said housing is selectively locked in one of said first and said rearward positions; and
a cam plate supported for rotational displacement relative to said housing for positioning said lock pin relative to said lower quadrant disk; and
a recliner mechanism supported by said slide-pin subassembly for pivotal displacement between a second position and a forward position.

8. The assembly of claim 7 wherein said slide-pin subassembly includes a housing supporting said lock pin in an elongated slot, said lock pin displaceable within said slot between a locked position and an unlocked position.

9. The assembly of claim 8 wherein said lower quadrant disk includes a first thrust surface adapted to unlock said slide-pin subassembly from said first position and a second thrust surface adapted to unlock said slide-pin subassembly from said rearward position.

10. The assembly of claim 9 wherein said lower quadrant disk includes a cammed surface disposed between said first and second thrust surfaces for engaging said lock pin when said lock pin is pivoting between said first position and said rearward position.

11. The assembly of claim 7 wherein said cam plate includes a cross member for engaging said lower quadrant disk to prevent said slide-pin subassembly from pivoting forward of said first position.

12. The assembly of claim 7 wherein said lower quadrant disk includes a toothed portion for being selectively engaged by said lock pin when said slide-pin subassembly is in said rearward position.

13. The assembly of claim 7 wherein said slide-pin subassembly further includes a biasing member for biasing said lock pin into engagement with said lower quadrant disk.

14. A vehicle seat assembly, comprising:
a seat bottom;
a seat back;
a lower quadrant disk;
a slide-pin subassembly including:
a housing supported on said lower quadrant disk for pivotal displacement between a first position and a rearward position;
a lock pin slidably supported by said housing and engaging said lower quadrant disk, whereby said housing is selectively locked in one of said first position and said rearward position; and
a cam plate supported for rotational displacement relative to said housing for positioning said lock pin relative to said lower quadrant disk; and
a recliner mechanism supported by said slide-pin subassembly and attached to said seat back for pivotal displacement of said seat back relative to said seat bottom.

15. The assembly of claim 14 wherein said slide-pin subassembly includes a housing supporting said lock pin in an elongated slot, said lock pin displaceable within said slot between a locked position and an unlocked position.

16. The assembly of claim 15 wherein said lower quadrant disk includes a first thrust surface adapted to unlock said slide-pin subassembly from said first position and a second thrust surface adapted to unlock said slide-pin subassembly from said rearward position.

17. The assembly of claim 16 wherein said lower quadrant disk includes a cammed surface disposed between said first and second thrust surfaces for engaging said lock pin when said lock pin is pivoting between said first position and said rearward position.

18. The assembly of claim 16 further comprising a seat pivot supporting a front side of said seat bottom for approximately 180° pivotal displacement.

19. The assembly of claim 16 wherein said seat bottom includes a bottom surface and a top surface, said top surface adapted to be exposed in a seating position and said bottom surface adapted to be exposed in a load floor position.

20. The assembly of claim 14 wherein said cam plate includes a cross member for engaging said lower quadrant disk to prevent said slide-pin subassembly from pivoting forward of said first position.

21. The assembly of claim 14 wherein said lower quadrant disk includes a toothed portion for being selectively engaged by said lock pin when said slide-pin subassembly is in said rearward position.

22. The assembly of claim 14 wherein said slide-pin subassembly further includes a biasing member for biasing said lock pin into engagement with said lower quadrant disk.

* * * * *